(12) United States Patent
Melack et al.

(10) Patent No.: US 12,046,728 B2
(45) Date of Patent: Jul. 23, 2024

(54) BATTERY WITH COMPRESSION AND PREVENTION OF THERMAL RUNAWAY PROPAGATION FEATURES

(71) Applicant: Wisk Aero LLC, Mountain View, CA (US)

(72) Inventors: John Melack, Redwood City, CA (US); Thomas P. Muniz, Sunnyvale, CA (US); Nihal Murthy, San Francisco, CA (US)

(73) Assignee: Wisk Aero LLC, Mountain View, CA (US)

( * ) Notice: Subject to any disclaimer, the term of this patent is extended or adjusted under 35 U.S.C. 154(b) by 667 days.

(21) Appl. No.: 17/091,751

(22) Filed: Nov. 6, 2020

(65) Prior Publication Data

US 2021/0057788 A1 Feb. 25, 2021

Related U.S. Application Data

(62) Division of application No. 15/286,952, filed on Oct. 6, 2016, now Pat. No. 10,873,111.

(Continued)

(51) Int. Cl.
*H01M 10/617* (2014.01)
*C09D 7/00* (2018.01)
(Continued)

(52) U.S. Cl.
CPC ............ *H01M 10/617* (2015.04); *C09D 7/00* (2013.01); *H01M 10/0413* (2013.01); *H01M 10/0481* (2013.01); *H01M 10/613* (2015.04); *H01M 10/625* (2015.04); *H01M 10/647* (2015.04); *H01M 10/6551* (2015.04); *H01M 10/6554* (2015.04); *H01M 10/658* (2015.04); *H01M 50/211* (2021.01); *H01M 50/224* (2021.01);

(Continued)

(58) Field of Classification Search
CPC ............ H01M 50/211; H01M 10/613; H01M 10/617; H01M 10/647; H01M 10/6551; H01M 10/658
See application file for complete search history.

(56) References Cited

U.S. PATENT DOCUMENTS 3,607,440 A 9/1971 Daniel et al.
4,137,376 A 1/1979 Clegg et al.
(Continued)

FOREIGN PATENT DOCUMENTS

AU 2008200543 A1 8/2009
CN 1070651 4/1993
(Continued)

OTHER PUBLICATIONS

English language machine translation of CN103050744A. (Year: 2013).*

(Continued)

*Primary Examiner* — Jonathan G Jelsma
(74) *Attorney, Agent, or Firm* — Kilpatrick Townsend & Stockton LLP

(57) ABSTRACT

A battery includes a metal can having a bottom, a top opening, and four sides. The battery also includes a plurality of cells stacked inside the metal can, wherein at least two opposing sides of the four sides of the metal can are biased inward against the plurality of cells to provide compression.

18 Claims, 20 Drawing Sheets

Top View

Related U.S. Application Data

(60) Provisional application No. 62/372,449, filed on Aug. 9, 2016.

(51) Int. Cl.

| | | |
|---|---|---|
| *H01M 10/04* | (2006.01) | |
| *H01M 10/613* | (2014.01) | |
| *H01M 10/625* | (2014.01) | |
| *H01M 10/647* | (2014.01) | |
| *H01M 10/6551* | (2014.01) | |
| *H01M 10/6554* | (2014.01) | |
| *H01M 10/658* | (2014.01) | |
| *H01M 50/211* | (2021.01) | |
| *H01M 50/224* | (2021.01) | |
| *H01M 50/24* | (2021.01) | |
| *H01M 50/271* | (2021.01) | |
| *H01M 50/375* | (2021.01) | |
| *H01M 50/502* | (2021.01) | |
| *H01M 50/105* | (2021.01) | |
| *H01M 50/284* | (2021.01) | |
| *H01M 50/296* | (2021.01) | |

(52) U.S. Cl.
CPC ......... *H01M 50/24* (2021.01); *H01M 50/271* (2021.01); *H01M 50/375* (2021.01); *H01M 50/502* (2021.01); *H01M 50/105* (2021.01); *H01M 50/284* (2021.01); *H01M 50/296* (2021.01); *H01M 2200/10* (2013.01); *H01M 2220/20* (2013.01)

(56) References Cited

U.S. PATENT DOCUMENTS

| | | | |
|---|---|---|---|
| 5,354,630 | A | 10/1994 | Earl et al. |
| 5,438,100 | A | 8/1995 | Shinozaki et al. |
| 5,670,272 | A | 9/1997 | Cheu et al. |
| 6,087,036 | A | 7/2000 | Rouillard et al. |
| 6,372,377 | B1 | 4/2002 | Ovshinsky et al. |
| 8,865,337 | B2 | 10/2014 | Culver et al. |
| 8,993,145 | B2 | 3/2015 | Muniz |
| 10,593,920 | B2 | 3/2020 | Melack et al. |
| 10,756,398 | B2 | 8/2020 | Melack et al. |
| 10,873,111 | B2 | 12/2020 | Melack et al. |
| 11,114,725 | B2 | 9/2021 | Melack et al. |
| 11,552,346 | B2 | 1/2023 | Melack et al. |
| 2005/0110458 | A1 | 5/2005 | Seman, Jr. et al. |
| 2005/0132562 | A1 | 6/2005 | Saito et al. |
| 2005/0253553 | A1 | 11/2005 | Phillips et al. |
| 2005/0259404 | A1 | 11/2005 | Marraffa |
| 2005/0269995 | A1 | 12/2005 | Donnelly et al. |
| 2006/0273758 | A1 | 12/2006 | Sanada et al. |
| 2008/0057392 | A1 | 3/2008 | Takamatsu et al. |
| 2008/0169788 | A1 | 7/2008 | Bobbin et al. |
| 2008/0193830 | A1* | 8/2008 | Buck .................. H01M 10/613 429/120 |
| 2009/0220852 | A1 | 9/2009 | Fujii |
| 2010/0112425 | A1 | 5/2010 | Dunn |
| 2010/0285346 | A1 | 11/2010 | Graban et al. |
| 2011/0027630 | A1 | 2/2011 | Tsutsumi et al. |
| 2011/0293997 | A1 | 12/2011 | Tartaglia |
| 2012/0003508 | A1 | 1/2012 | Narbonne et al. |
| 2012/0009455 | A1 | 1/2012 | Yoon |
| 2012/0058386 | A1 | 3/2012 | Wyser et al. |
| 2012/0247107 | A1 | 10/2012 | Balk et al. |
| 2013/0004813 | A1* | 1/2013 | Kim .................. H01M 50/308 429/87 |
| 2013/0022859 | A1 | 1/2013 | Lim |
| 2013/0034773 | A1 | 2/2013 | Tsukuda et al. |
| 2013/0071717 | A1 | 3/2013 | Muniz |
| 2013/0101890 | A1 | 4/2013 | Ogg et al. |
| 2013/0120910 | A1 | 5/2013 | Watanabe |
| 2013/0130087 | A1 | 5/2013 | Kawaguchi et al. |
| 2013/0255293 | A1 | 10/2013 | Gadawski et al. |
| 2013/0273400 | A1 | 10/2013 | Musetti |
| 2013/0316214 | A1 | 11/2013 | Nagashima |
| 2014/0045024 | A1 | 2/2014 | Waters |
| 2014/0154535 | A1 | 6/2014 | Olsson et al. |
| 2014/0186683 | A1 | 7/2014 | Tyler et al. |
| 2014/0227576 | A1 | 8/2014 | Meintschel et al. |
| 2014/0242424 | A1 | 8/2014 | Jones |
| 2014/0272494 | A1 | 9/2014 | Silk et al. |
| 2014/0356690 | A1 | 12/2014 | Kim |
| 2015/0037616 | A1 | 2/2015 | Wyatt et al. |
| 2015/0037640 | A1 | 2/2015 | Pinon et al. |
| 2015/0037649 | A1 | 2/2015 | Wyatt et al. |
| 2015/0037662 | A1 | 2/2015 | Pinon et al. |
| 2015/0050535 | A1 | 2/2015 | Amiruddin et al. |
| 2015/0086832 | A1 | 3/2015 | Yang |
| 2015/0214570 | A1 | 7/2015 | Deponte et al. |
| 2015/0226615 | A1 | 8/2015 | Feldman et al. |
| 2015/0249234 | A1 | 9/2015 | Feigl et al. |
| 2015/0255826 | A1 | 9/2015 | Turner, III |
| 2015/0266387 | A1* | 9/2015 | Garfinkel .......... H01M 10/6551 180/65.21 |
| 2015/0283965 | A1 | 10/2015 | Lynds |
| 2016/0079639 | A1 | 3/2016 | Pinon |
| 2016/0093847 | A1 | 3/2016 | Gunther et al. |
| 2016/0197385 | A1 | 7/2016 | Matsumoto et al. |
| 2016/0218339 | A1 | 7/2016 | Nishimori et al. |
| 2016/0314903 | A1 | 10/2016 | Danov et al. |
| 2016/0315356 | A1 | 10/2016 | Moon et al. |
| 2016/0336627 | A1 | 11/2016 | Syed et al. |
| 2017/0025646 | A1* | 1/2017 | Ota .................. H01M 50/103 |
| 2017/0190264 | A1 | 7/2017 | Kim et al. |
| 2017/0222284 | A1 | 8/2017 | Ottomano et al. |
| 2018/0026296 | A1 | 1/2018 | Kruger et al. |
| 2018/0048036 | A1 | 2/2018 | Melack et al. |

FOREIGN PATENT DOCUMENTS

| | | |
|---|---|---|
| CN | 1874029 A | 12/2006 |
| CN | 201238056 | 5/2009 |
| CN | 101467282 A | 6/2009 |
| CN | 101814620 A | 8/2010 |
| CN | 102315501 A | 1/2012 |
| CN | 102315658 A | 1/2012 |
| CN | 102354773 A | 2/2012 |
| CN | 102569935 A | 7/2012 |
| CN | 202310441 | 7/2012 |
| CN | 102916145 A | 2/2013 |
| CN | 103022390 A | 4/2013 |
| CN | 103050744 | 4/2013 |
| CN | 103069611 | 4/2013 |
| CN | 103168387 A | 6/2013 |
| CN | 103380533 A | 10/2013 |
| CN | 103843241 A | 6/2014 |
| CN | 103890995 | 6/2014 |
| CN | 204071674 U | 1/2015 |
| CN | 104488108 A | 4/2015 |
| CN | 104519763 A | 4/2015 |
| CN | 104521023 | 4/2015 |
| CN | 104521024 A | 4/2015 |
| CN | 104604010 A | 5/2015 |
| CN | 104620344 A | 5/2015 |
| CN | 104662701 A | 5/2015 |
| CN | 104851992 | 8/2015 |
| CN | 104934656 | 9/2015 |
| CN | 105009321 | 10/2015 |
| CN | 105226215 A | 1/2016 |
| CN | 105280986 | 1/2016 |
| CN | 105409031 A | 3/2016 |
| CN | 105470421 | 4/2016 |
| CN | 105765757 A | 7/2016 |
| CN | 105870543 A | 8/2016 |
| CN | 106941142 A | 7/2017 |
| CN | 207217718 U | 4/2018 |
| DE | 102011106690 A1 | 1/2012 |
| FR | 2993708 | 1/2014 |
| JP | 0635540 | 5/1994 |
| JP | 06338304 A | 12/1994 |
| JP | 2006339032 A | 12/2006 |

(56) References Cited

FOREIGN PATENT DOCUMENTS

| JP | 2007175871 A | 7/2007 |
|---|---|---|
| JP | 2008084650 A | 4/2008 |
| JP | 2011243358 A | 12/2011 |
| JP | 2011249251 A | 12/2011 |
| JP | 2012079689 A | 4/2012 |
| JP | 2012089415 A | 5/2012 |
| JP | 2012174408 A | 9/2012 |
| JP | 2012174970 A | 9/2012 |
| JP | 2012174972 A | 9/2012 |
| JP | 2012175874 A | 9/2012 |
| JP | 2012248374 A | 12/2012 |
| JP | 2013016375 A | 1/2013 |
| JP | 5201757 B1 | 2/2013 |
| JP | 2014220099 A | 11/2014 |
| JP | 2015060690 A | 3/2015 |
| JP | 2015069873 A | 4/2015 |
| JP | 2017509381 A | 4/2017 |
| JP | 6147346 B2 | 6/2017 |
| KR | 20130100365 A | 9/2013 |
| KR | 20170095136 A | 8/2017 |
| TW | 555160 U | 9/2003 |
| WO | 2011105256 A1 | 9/2011 |
| WO | 2015019429 A1 | 2/2015 |

OTHER PUBLICATIONS

U.S. Appl. No. 16/934,017 , "Final Office Action", dated May 18, 2022, 26 pages.
EP18929969.6 , "Extended European Search Report", dated Apr. 7, 2022, 8 pages.
U.S. Appl. No. 16/788,664 , "Non-Final Office Action", dated Jan. 27, 2021, 5 pages.
CA3, 104,826 , "Office Action", dated Feb. 4, 2021, 5 pages.
CN201780048522.0 , Feb. 2, 2021, 21 pages.
EP19823007.0 , "Office Action", dated Feb. 12, 2021, 3 pages.
NZ750395 , "Notice of Acceptance", dated Jul. 23, 2020, 1 page.
PCT/US2018/049375 , "International Preliminary Report on Patentability", dated Feb. 25, 2021, 5 pages.
PCT/US2019/036936 , "International Preliminary Report on Patentability", dated Dec. 30, 2020, 8 pages.
AU2019290497 , "Notice of Acceptance", dated Oct. 9, 2021, 3 pages.
CN201980054291.3 , "Office Action", dated Aug. 26, 2021, 27 pages.
EP18929969.6 , "Office Action", dated Mar. 23, 2021, 3 pages.
KR10-2021-7002121 , "Notice of Decision to Grant", dated Oct. 1, 2021, 3 pages.
NZ771878 , "Second Examination Report", dated Sep. 13, 2021, 1 page.
CA3,108,660 , "Office Action", dated Mar. 21, 2022, 6 pages.
CN201980054291.3 , "Office Action", dated Feb. 17, 2022, 20 pages.
NZ771878 , "Notice of Acceptance", dated Mar. 11, 2022, 2 pages.
U.S. Appl. No. 16/934,017 , "Advisory Action", dated Jul. 29, 2022, 4 pages.
U.S. Appl. No. 16/934,017 , "Notice of Allowance", dated Aug. 18, 2022, 9 pages.
CN201780048522.0 , "Supplementary Search Report", dated May 26, 2022, 1 page.
AU2021286328 , "Office Action", dated Dec. 7, 2022, 3 pages.
CA3,108,660 , "Office Action", dated Dec. 16, 2022, 6 pages.
CA3,131,713 , "Notice of Allowance", dated Feb. 6, 2023, 1 page.
KR10-2021-7043440 , "Notice of Decision to Grant", dated Dec. 23, 2022, 8 pages.
U.S. Appl. No. 16/934,017 , "Non-Final Office Action", dated Feb. 7, 2022, 27 pages.
CN201780048522.0 , "Office Action", dated Feb. 15, 2022, 26 pages.
EP19823007.0 , "Extended European Search Report", dated Feb. 25, 2022, 6 pages.
U.S. Appl. No. 16/788,664 , "Notice of Allowance", dated May 5, 2021, 7 pages.
AU2019290497 , "First Examination Report", dated Apr. 6, 2021, 2 pages.
NZ771878 , "First Examination Report", dated Mar. 11, 2021, 4 pages.
U.S. Appl. No. 16/934,017 , "Corrected Notice of Allowability", dated Nov. 23, 2022, 3 pages.
CN201980054291.3 , "Office Action", dated Sep. 28, 2022, 24 pages.
JP2021-507578 , "Office Action", dated Oct. 11, 2022, 7 pages.
KR10-2021-7043440 , "Office Action", dated Oct. 7, 2022, 8 pages.
U.S. Appl. No. 16/788,664 , "Corrected Notice of Allowability", dated Jul. 16, 2021, 3 pages.
CA3,104,826 , "Notice of Allowance", dated Jul. 13, 2021, 1 page.
CN201780048522.0 , "Office Action", dated Aug. 10, 2021, 28 pages.
KR10-2021-7002121 , "Office Action", dated Jun. 8, 2021, 10 pages.
U.S. Appl. No. 15/286,952 , Non-Final Office Action, dated Mar. 5, 2019, 19 pages.
U.S. Appl. No. 15/286,952 , Notice of Allowance, dated Aug. 23, 2019, 12 pages.
U.S. Appl. No. 15/286,952 , Notice of Allowance, dated Aug. 19, 2020, 7 pages.
U.S. Appl. No. 16/102,315 , Final Office Action, dated Jan. 18, 2019, 12 pages.
U.S. Appl. No. 16/102,315 , Final Office Action, dated Jun. 21, 2019, 9 pages.
U.S. Appl. No. 16/102,315 , Non-Final Office Action, dated May 3, 2019, 10 pages.
U.S. Appl. No. 16/102,315 , Non-Final Office Action, dated Oct. 9, 2018, 13 pages.
U.S. Appl. No. 16/102,315 , Notice of Allowance, dated Nov. 5, 2019, 5 pages.
U.S. Appl. No. 16/102,315 , Notice of Allowance, dated Oct. 1, 2019, 6 pages.
U.S. Appl. No. 16/438,963 , Final Office Action, dated Dec. 10, 2019, 11 pages.
U.S. Appl. No. 16/438,963 , Non-Final Office Action, dated Aug. 13, 2019, 26 pages.
U.S. Appl. No. 16/438,963 , Notice of Allowance, dated Apr. 21, 2020, 8 pages.
CN202310441 , "Google Machine Translation", Jul. 4, 2012, 6 pages.
Application No. EP17839952.3 , Extended European Search Report, dated May 29, 2020, 10 pages.
EP17839952.3 , "Partial Supplementary European Search Report", dated Jan. 3, 2020, 11 pages.
JPH0635540 , "Google English Machine Translation", May 13, 1994, 6 pages.
Meyer et al., "Battery Box", Home Power, vol. 119, Jun.-Jul. 2007, pp. 50-55.
NZ750395 , "First Examination Report", dated Jul. 23, 2019, 4 pages.
Application No. PCT/US2017/024458 , International Preliminary Report on Patentability, dated Feb. 21, 2019, 7 pages.
Application No. PCT/US2017/024458 , International Search Report and Written Opinion, dated Jun. 19, 2017, 7 pages.
Application No. PCT/US2018/049375 , International Search Report and Written Opinion, dated Nov. 30, 2018, 6 pages.
Application No. PCT/US2019/036936 , International Search Report and Written Opinion, dated Sep. 5, 2019, 9 pages.
KR10-2021-7007181 , "Office Action", dated Oct. 19, 2023, 12 pages.
U.S. Appl. No. 17/395,259 , "Final Office Action", dated Oct. 26, 2023, 13 pages.
U.S. Appl. No. 17/395,259 , "Non-Final Office Action", dated Jul. 20, 2023, 13 pages.
AU2021286328 , "Notice of Acceptance", dated May 18, 2023, 3 pages.
JP2021-146636 , "Office Action", dated Jun. 13, 2023, 7 pages.
JP2021-507578 , "Office Action", dated May 9, 2023, 4 pages.

(56) References Cited

OTHER PUBLICATIONS

EP17839952.3 , "Office Action", dated Aug. 4, 2023, 5 pages.
CA3,108,660 , "Office Action", Feb. 16, 2024, 6 pages.
CN201880098626.7 , "Office Action", Apr. 1, 2024, 20 pages.

* cited by examiner

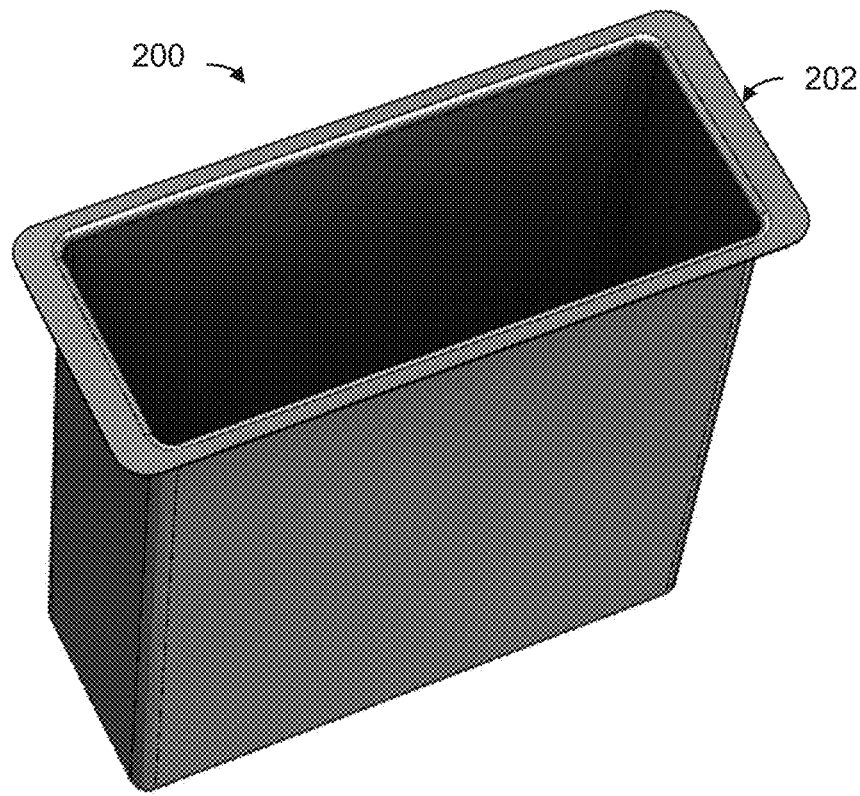
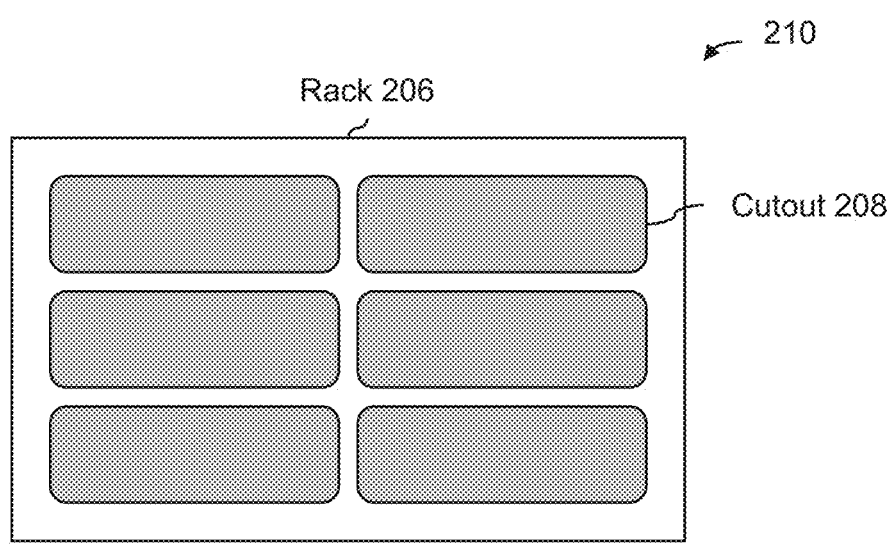
FIG. 2

Top View

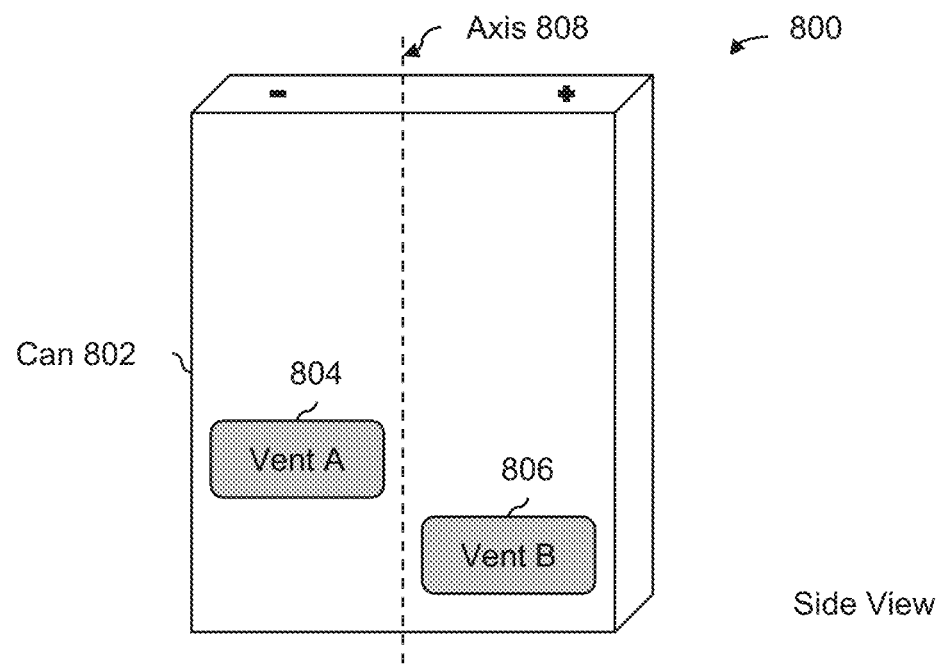
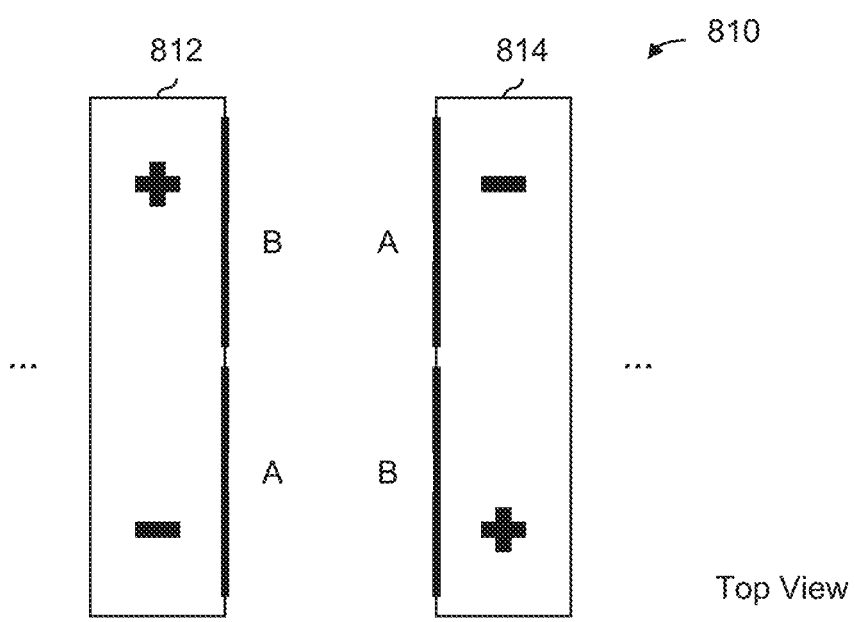
FIG. 8

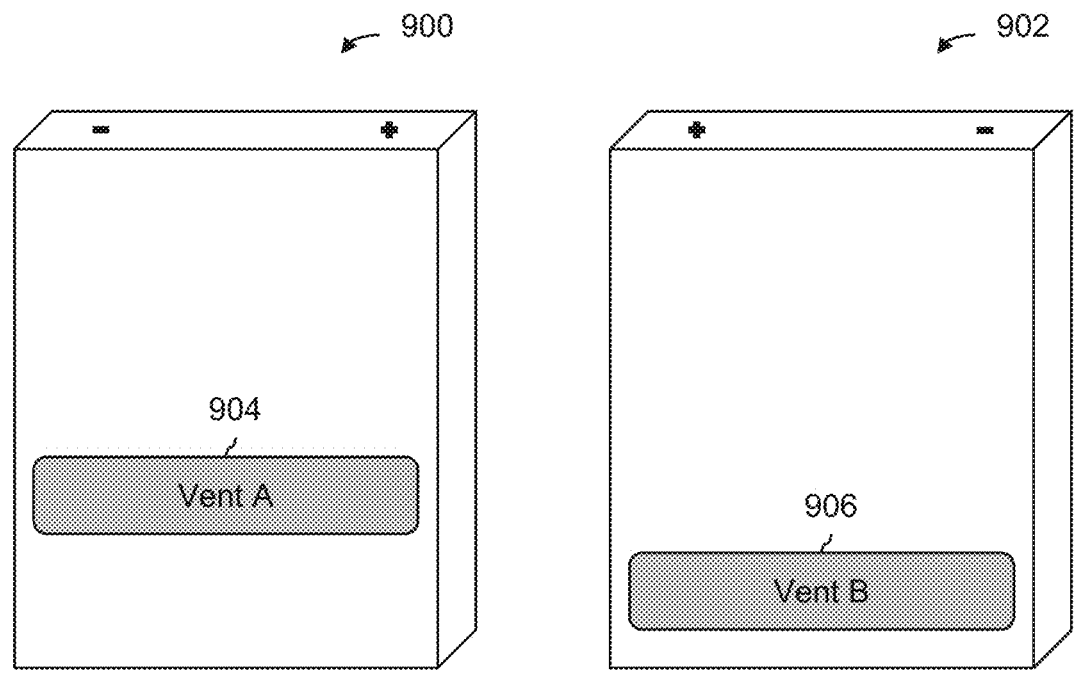
Side View
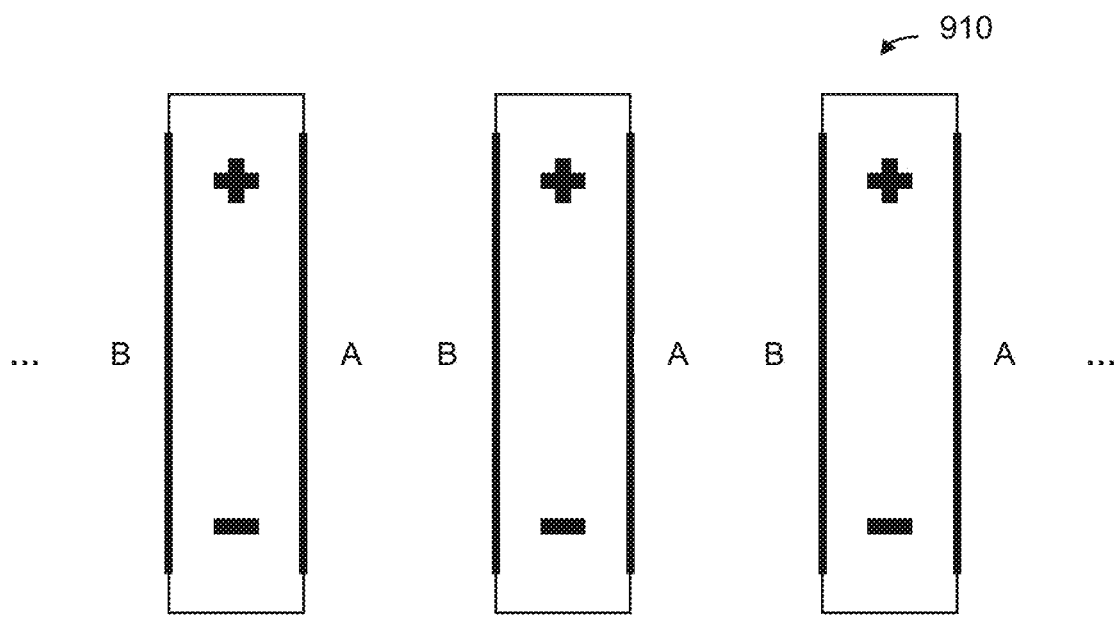
Top View
FIG. 9

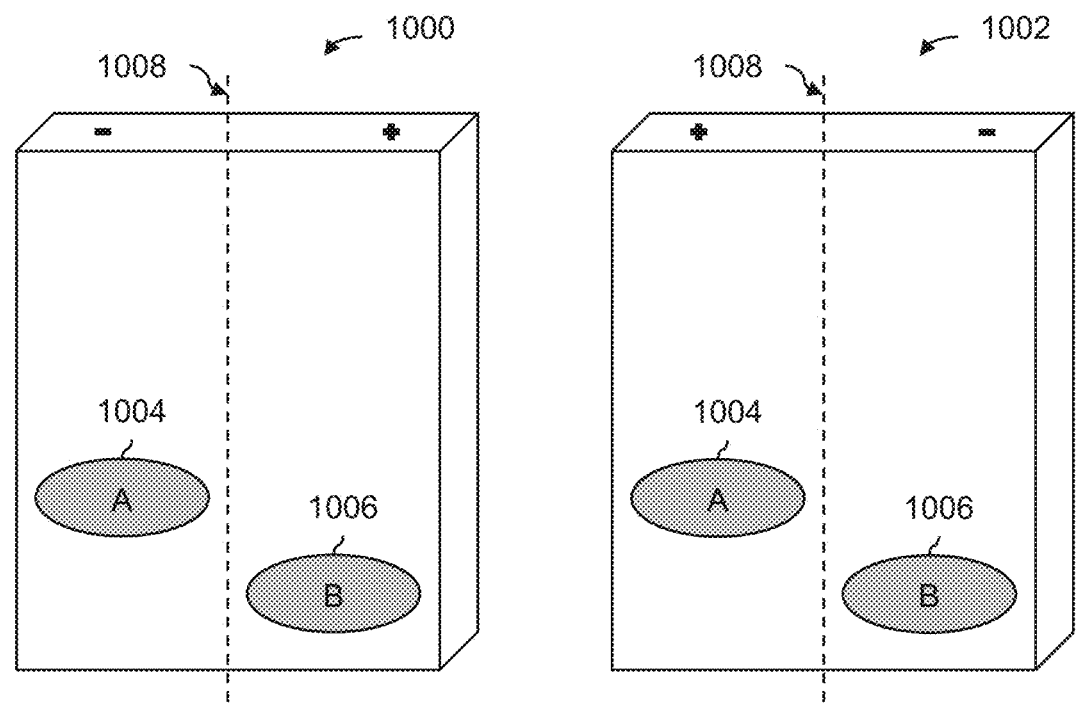
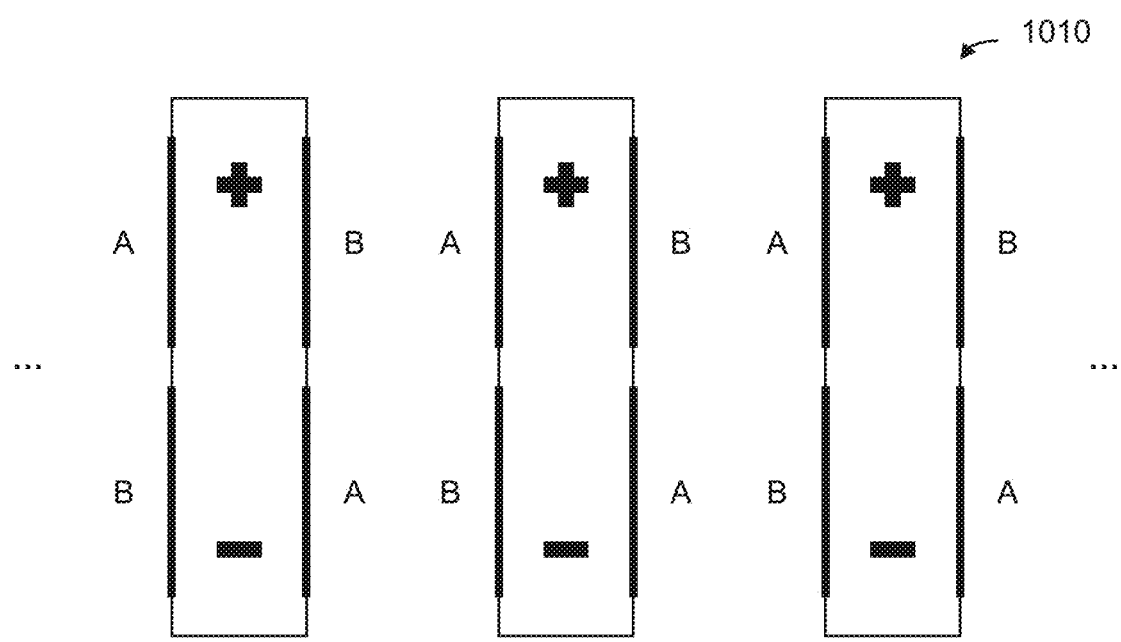
Side View
Top View
FIG. 10

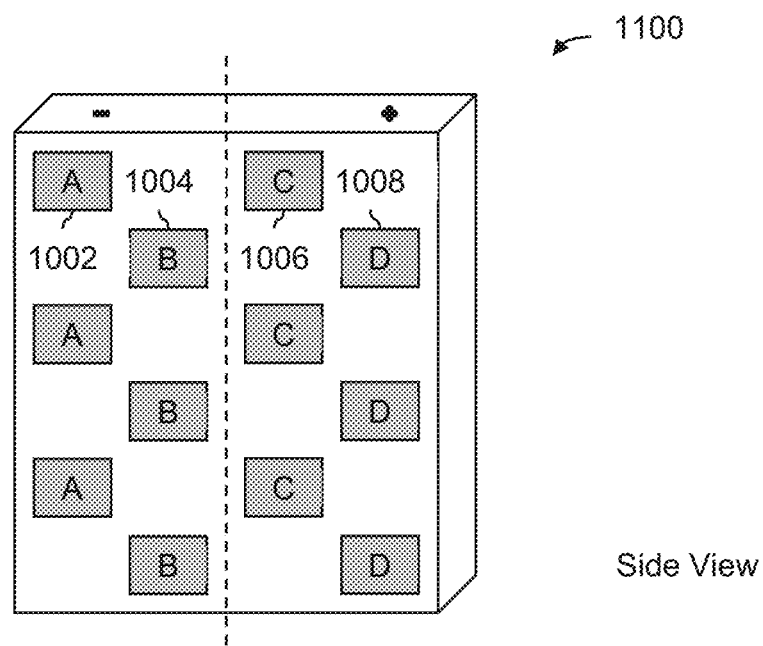
Side View
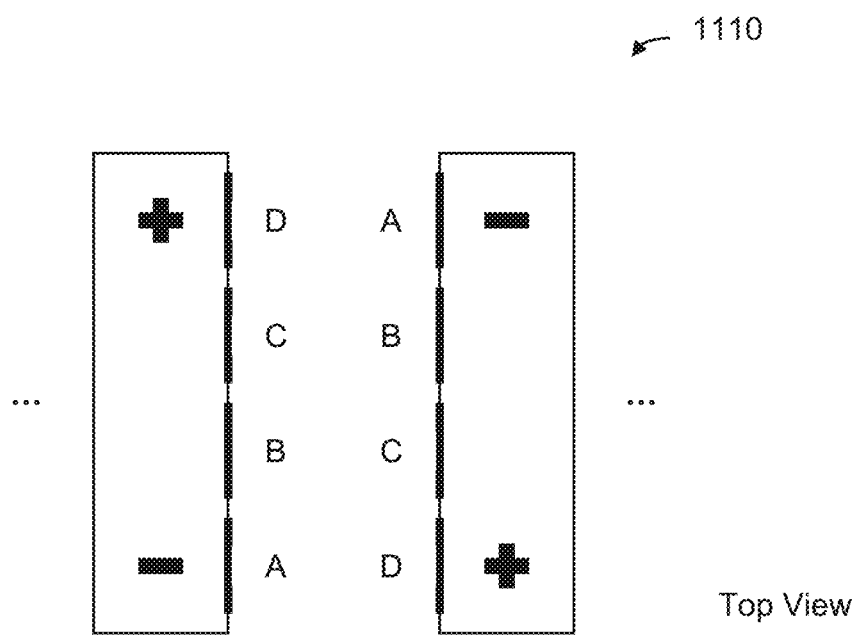
Top View
FIG. 11

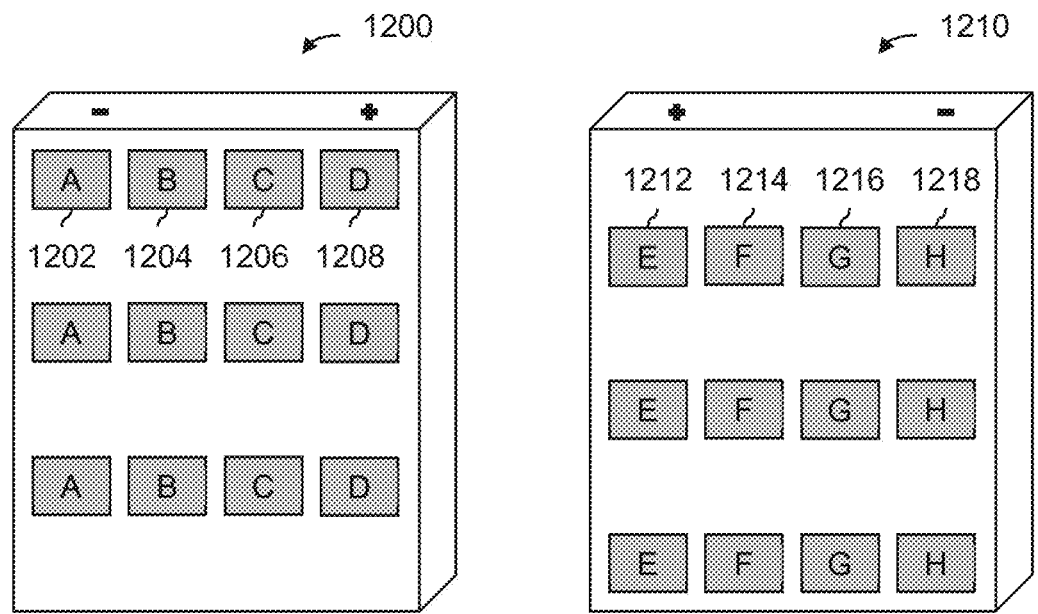
Side View
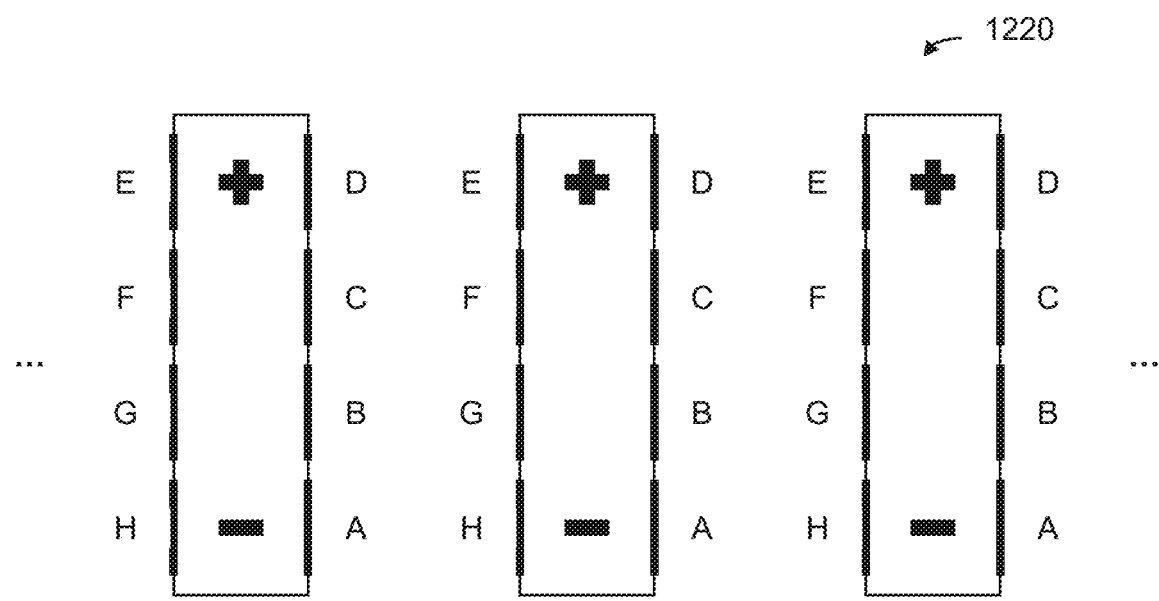
Top View
FIG. 12

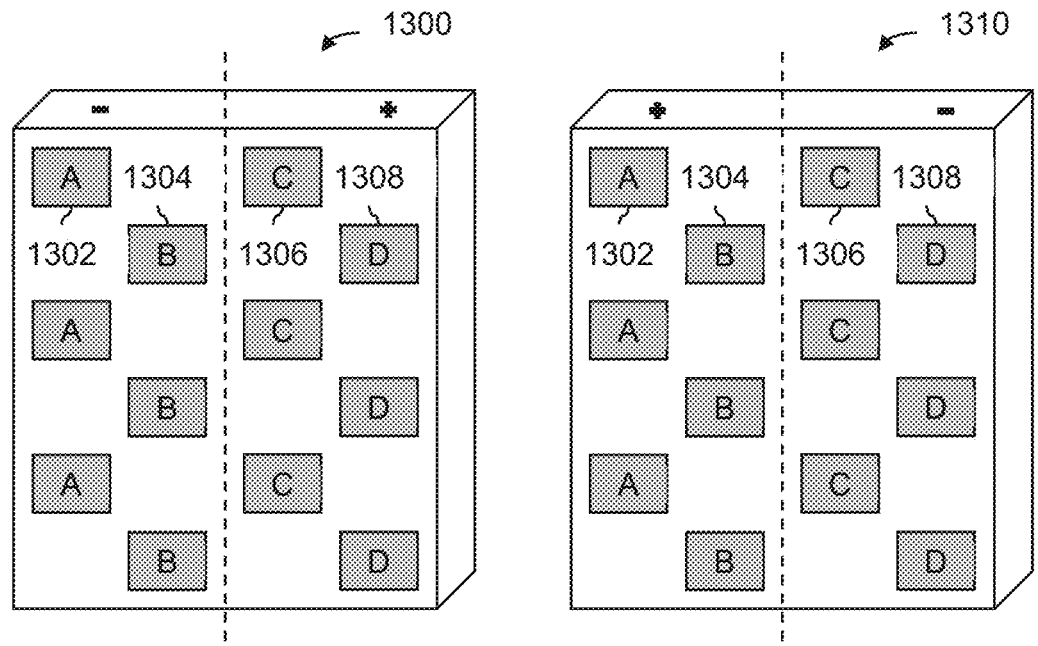
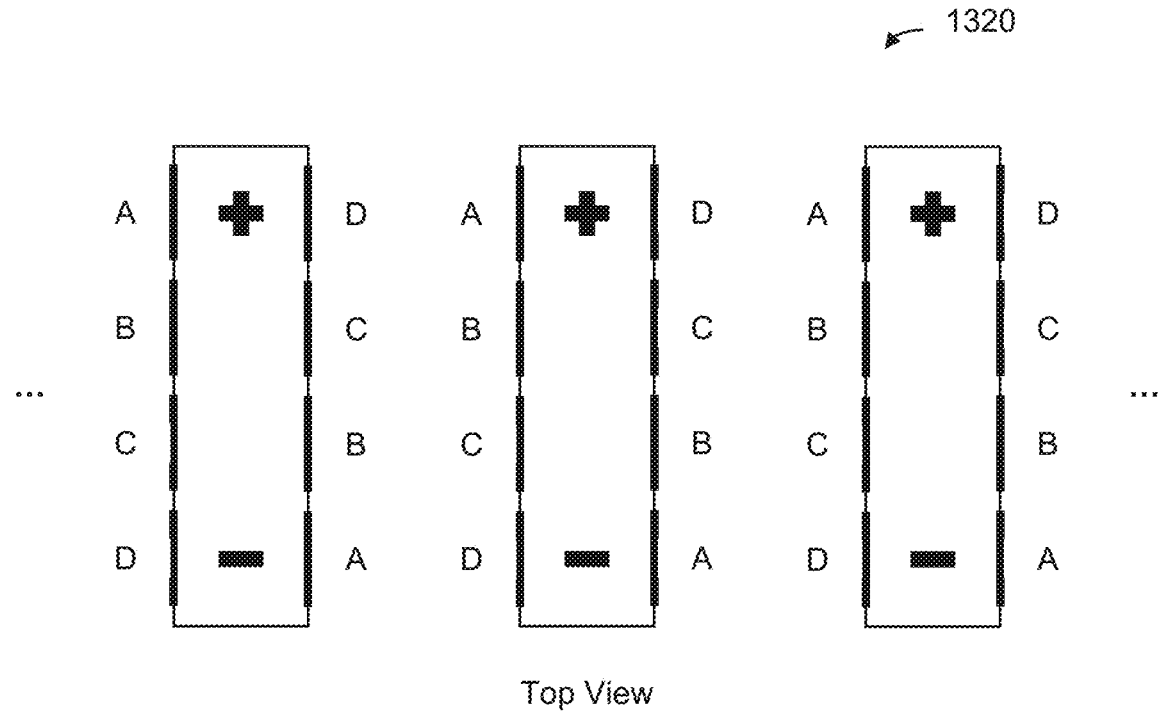
Side View
Top View
FIG. 13

FIG. 15  Top View

BATTERY WITH COMPRESSION AND PREVENTION OF THERMAL RUNAWAY PROPAGATION FEATURES

CROSS REFERENCE TO OTHER APPLICATIONS

This application is a division of U.S. Non-Provisional patent application Ser. No. 15/286,952 entitled BATTERY WITH COMPRESSION AND PREVENTION OF THERMAL RUNAWAY PROPAGATION FEATURES filed Oct. 6, 2016, which claims priority to U.S. Provisional Patent Application No. 62/372,449 entitled KITE SUBMODULE filed Aug. 9, 2016, the disclosures of which are incorporated herein by reference for all purposes.

BACKGROUND OF THE INVENTION

Thermal runaway in a battery may occur when one or more cells fail catastrophically, which releases a significant amount of heat (e.g., on the order of hundreds of ° C.). Batteries which prevent thermal runaway but which also offer performance advantages during normal operation would be desirable.

BRIEF DESCRIPTION OF THE DRAWINGS

Various embodiments of the invention are disclosed in the following detailed description and the accompanying drawings.

FIG. 2 is a diagram illustrating an embodiment of a metal can.

FIG. 8 is a diagram illustrating an embodiment of a can with two vent holes on a side where cans are placed next to each other with terminals of opposite polarity next to each other.

FIG. 9 is a diagram illustrating an embodiment of a can with a single vent hole on a side where cans are placed next to each other with terminals of the same polarity next to each other.

FIG. 10 is a diagram illustrating an embodiment of a can with two vent holes on a side where cans are placed next to each other with terminals of the same polarity next to each other.

FIG. 11 is a diagram illustrating an embodiment of a can with 12 vent holes on a side where cans are placed next to each other with terminals of opposite polarity next to each other.

FIG. 12 is a diagram illustrating an embodiment of a can with 12 vent holes on a side with different patterns where cans are placed next to each other with terminals of the same polarity next to each other.

FIG. 13 is a diagram illustrating a second embodiment of a can with 12 vent holes with the same pattern on each side where cans are placed next to each other with terminals of the same polarity next to each other.

DETAILED DESCRIPTION

Figure 1:
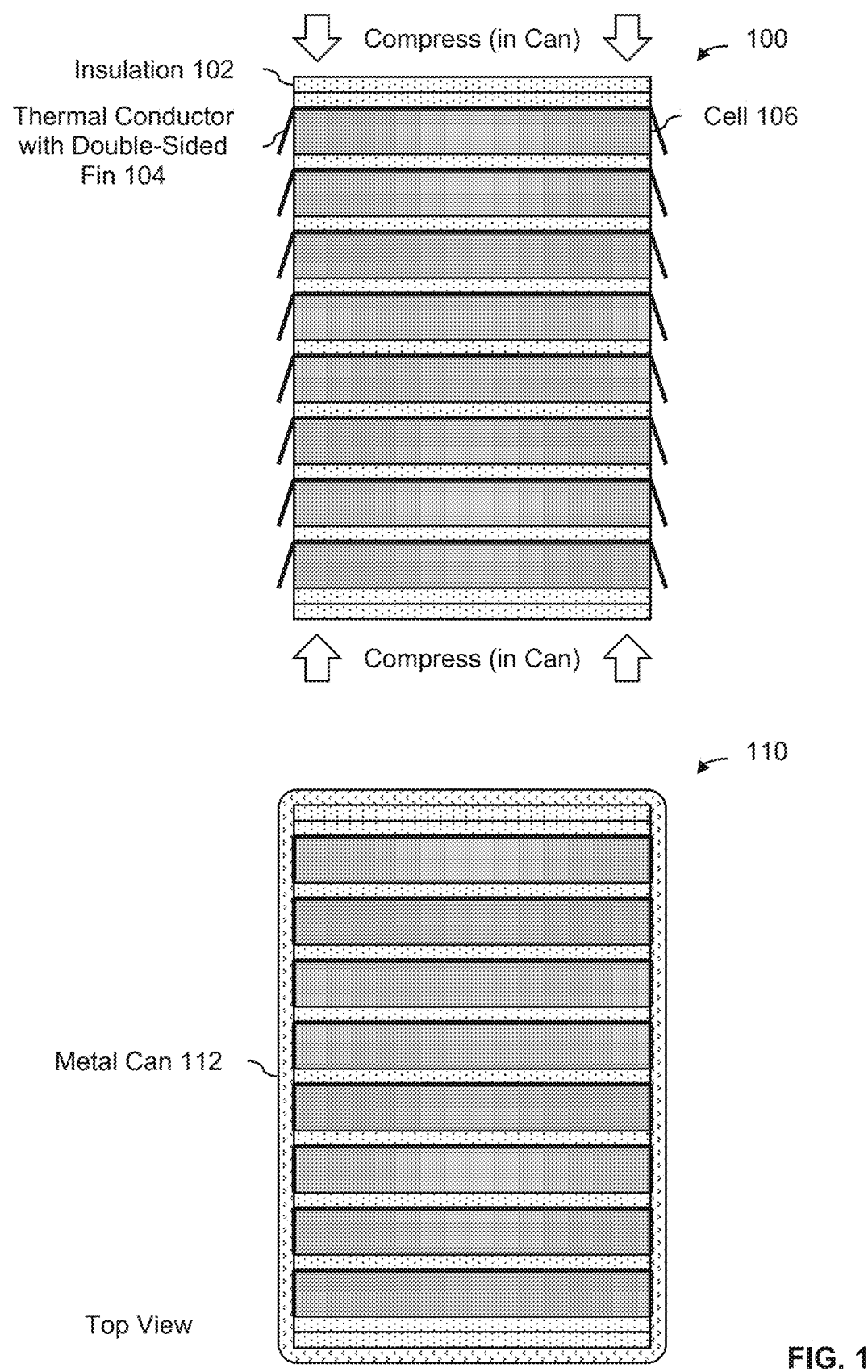
FIG. 1 is a diagram illustrating an embodiment of insulation and battery cells stacked with thermal conductors with double-sided fins.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Various embodiments of a battery are described herein. In at least some of these examples, the battery includes a metal can which has a bottom, top opening and four sides. A plurality of battery cells are stacked inside the metal can where at least two opposing sides of the metal can are biased inward (e.g., by compressing at least two sides of the metal can with the stacked layers inside) against the cells to provide compression. For example, as will be described in more detail below, the battery cells may be pouch cells which perform better under pressure and the inward biasing of the metal can puts pressure on the cells. In some embodiments, the cells are stacked with layers of insulation so that if one cell fails catastrophically, the released heat will not cause a neighboring cell to also fail. In some embodiments, the cells are stacked with thermal conductor layers with fins which help with heat dissipation (e.g., during normal operation or a catastrophic failure).

First, an example of stacked layers (e.g., which go into a metal can in some embodiments) is described. Then, an example of an empty can is described.

FIG. 1 is a diagram illustrating an embodiment of insulation and battery cells stacked with thermal conductors with double-sided fins. Diagram 100 shows a top view of the example contents of a metal can before the contents are put in the can and the can is compressed. In this example, the stacking pattern begins (e.g., going from top to bottom in diagram 100) with two layers of insulation (102). In this example, because the insulation (like all of the stacked layers) will be compressed, the insulation is made up of a material which can withstand (e.g., without collapsing) the expected pressure from the compressed can. For example, using the spring constant of a material as a metric of interest, the spring constant of the insulation should be non-negligible. In some embodiments, the insulation is made of aerogel which is a good thermal insulator and has a non-negligible spring constant.

Thermally, the layers of insulation prevent (or at least slow down and/or mitigate) heat from spreading from one cell to another cell. For example, suppose one cell fails catastrophically and in the process releases a large amount of heat. Without any insulation, all of that heat would propagate to a neighboring cell and cause that cell to also fail catastrophically. Eventually, all of the cells would fail catastrophically in a domino-like effect. This positive feedback cycle, domino-like effect (e.g., at the cell or battery level) is sometimes referred to as thermal runaway. The layers of insulation prevent (or at least slow down and/or mitigate) thermal runaway from happening (at least at the cell level).

After the two layers of insulation (e.g., going from top to bottom in diagram 100), the next layer is a thermal conductor with a double-sided fin (104). In this example, layer 104 is a thermal conductor and acts as a heat sink for the cell, removing the heat produced by the cell (e.g., during normal operation and/or a catastrophic failure) from the interior of the stacked layers to the exterior. The fin part of the thermal conductor layer refers to the one or more bent portions at the end(s). In this example, there are two bent portions: one at each end of fin 104. For this reason, this type of fin is referred to herein as a double-sided fin. Some examples described below use single-sided fins, where the fin only has one bent portion at one end.

Thermally, layer 104 is made of a material which is thermally conductive so that the fin can conduct heat away from the cell. Structurally, the fins act like a spring and push back when pressure is applied. This spring-like effect is useful because physical contact with the interior of the can is ensured even if there is some (e.g., air) gap around the fin. For example, if the edges of the layers are not aligned and/or the layers have different widths, then the fin may not be "squished" between the interior of the can and the side of the cell (e.g., unlike what is shown in diagram 110). The thermal conductor layer is better able to conduct heat when the fin is physically touching the can, so having the fin act like a spring ensures the fin always touches the can and has good thermal properties even if there is a gap around a bent portion of the fin. In some embodiments, layer 104 is made of metal (e.g., 1235 series Al) because metal is a good thermal conductor and permits the fin to act like a spring. A more detailed example is described in more detail below.

The next layer after layer 104 is a (battery) cell (106). In this example, the cells are pouch cells. Pouch cells perform better when pressure is applied (e.g., ~3-5 PSI). More specifically, the cycle life of pouch cells can be extended by applying pressure to the pouch cells. For this reason, the stacked layers shown in diagram 100 are compressed using a metal can.

The stacking pattern then repeats (e.g., insulation, thermal conductor with fin, cell, etc.) until the pattern ends with two layers of insulation (e.g., at the bottom of diagram 100). In this example, the stacking pattern begins and ends with two layers of insulation but this is not intended to be limiting. In some embodiments, there could be one layer of insulation or three layers of insulation, etc. at the ends. In some embodiments, the two layers of insulation at the beginning/end of the stacked pattern may be eliminated (e.g., because a counterpart or corresponding metal can has vents on all four sides). In some embodiments, the first layer and last layer comprises a thinner layer of insulation (e.g., compare to the layers of insulation which go between the cells). In some embodiments, the insulation (e.g., not just at the ends) is selected or otherwise takes into account ease of installation of the cell stack and/or compression of the cells.

A metal can with the stacked layers (shown in diagram 100) is then compressed and diagram 110 shows the resulting compressed can and contents. In one example of how the compressed can is manufactured, the layers are first stacked outside of the can. The stacked layers are then gathered together with the fins pressed flat against the sides of the cells. This may prevent the fins from catching on the can and/or getting damaged when the layers are inserted into the can. With the stacked layers in the can, the sides of the metal can are compressed, for example with pressure applied to the "face" of the cells (e.g., the longer/larger sides) because that is what helps increase cycle life. In some embodiments, the compression machinery compresses the can to predetermined dimensions (e.g., a predetermined width and/or predetermined depth).

Naturally, any assembly and/or manufacturing process may be used. In another example, the can is placed on its side with the top opening facing sideways and the longer sides of the can oriented vertically (e.g., so that diagrams 100 and 110 would be side views). The layers may then be inserted into the can (e.g., one at a time and in the proper order). Once full, the can may be compressed.

Diagram 110 shows the stacked layers inside the metal can (112) after the can has been compressed so that the can is applying some desired amount of pressure (e.g., ~3-5 PSI) on the battery cells. In this example at least, the compression of the can and its contents causes the fins to fold and those parts of the fins are flush against both the can (112) and the sides of the cells. As described above, even if there is an air gap (which is not shown in diagram 110), the spring-like action of the fins will cause the fins to make contact with the interior of the can.

To reiterate the benefits described above, the exemplary battery offers good thermal insulation between adjacent cells so that heat cannot spread (or at least, cannot spread as quickly) from one cell to another cell during a catastrophic failure. Another benefit to the exemplary battery is that the cycle life of the cells is extended because of the pressure applied by the can.

It is noted that this figure is merely exemplary and is not intended to be limiting. For example, although there are eight battery cells per battery, a battery may include any number of battery cells. Similarly, the dimensions (e.g., widths, depths, etc.) shown here are not to scale and are not intended to be limiting. For example, the thickness of can 112 has been exaggerated so that the different components of the exemplary battery can be better seen.

The following figure illustrates an example of an empty can and a rack which holds multiple batteries.

FIG. 2 is a diagram illustrating an embodiment of a metal can. In the example shown, diagram 200 shows an example of a metal can which may be used to hold and compress stacked layers (e.g., including insulation and battery cells). As described above, the metal can is compressed with the stacked layers in the can. Therefore, in some embodiments the can is made of a material which is relatively easy to compress and can subsequently maintain its form and/or structure so that the contents of the can remain under pressure months or even years after the can has been compressed. It would not be desirable, for example, if a metal can lost its shape over time and the battery cells eventually had little or no pressure applied to them. In one example, the can is made of 1000 series aluminum (e.g., 1070 T0) and the walls are approximately 0.024" thick and the bottom of the can is approximately ¹⁄₁₆" thick. 1070 T0 aluminum can be compressed relatively easily but maintains its shape or structure after being compressed which (as described above) is desirable. The can may be manufactured using any appropriate technique including (but not limited to) deep drawing or impact extrusion (which may be less expensive than deep drawing).

In this example, the metal can has a flanged top (202). The flanged top permits the battery to sit (e.g., without falling through) in a frame or rack (206) which has cutouts (208) for batteries to be inserted into. Diagram 210 shows an example of such a rack with six cutouts. In some embodiments, the interior of the rack may hold other (e.g., electrical) components, such as a flight computer. In some aircraft applications (e.g., drones or other "bare bones" aircraft), there is a minimal amount of casing or shielding to protect the batteries and other sensitive (e.g., electrical) components from debris which is blown about by the rotors/propellers. Another benefit to the flanged top is that it prevents debris from entering the interior of a rack. This may prevent the batteries (and/or other equipment, if contained in the rack) from getting dirt or sand blown into them. Naturally, the number of cutouts and the dimensions shown here are merely exemplary and are not intended to be limiting.

The following figure shows an example of tabs which are used to conduct the electricity generated by the battery cells out of the interior of the can.

Figure 3:
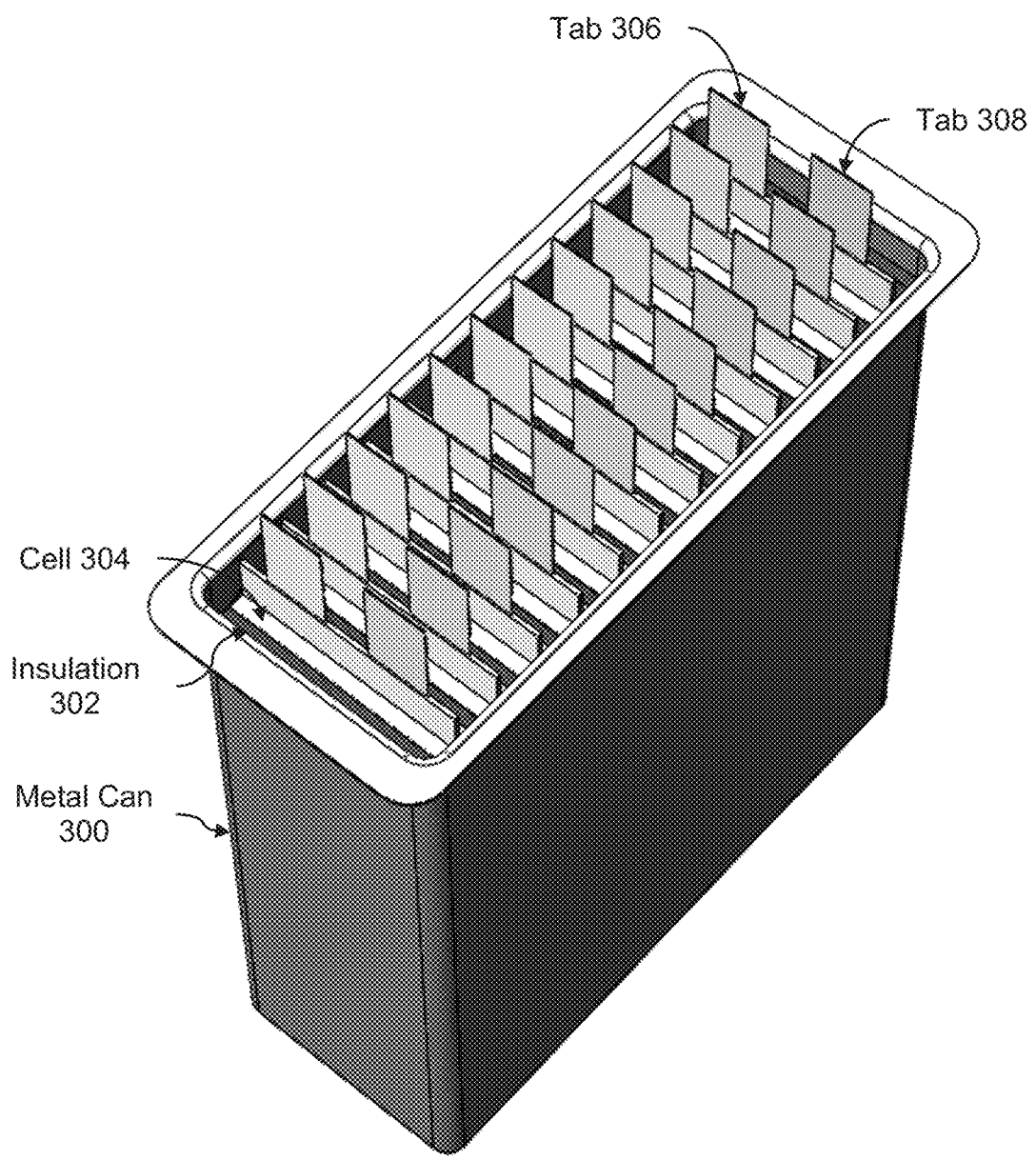
FIG. 3 is a diagram illustrating an embodiment of a compressed metal can with stacked layers, including tabs.

FIG. 3 is a diagram illustrating an embodiment of a compressed metal can with stacked layers, including tabs. In the example shown, metal can 300 holds stacked layers, including insulation (302) and cells (304). As described above, the can has been compressed so that the cells operate under some desired amount of pressure.

This diagram also shows tabs (306 and 308) which are used to conduct the electricity generated by the cells out of the can. In this example, tab 306 is a positive tab and tab 308 is a negative tab. At one end, these tabs are electrically connected to the cells in the can. At the other end, the tabs are electrically connected to the underside of a lid (not shown). This permits the electricity generated by the cells in the can to be accessed from a positive terminal and a negative terminal on the top of the can. The following figure shows an example of a battery with an attached lid and illustrates another reason why (e.g., for embodiments with tabs) it may be desirable to have a can which compresses or otherwise applies pressure to its contents.

Figure 4:
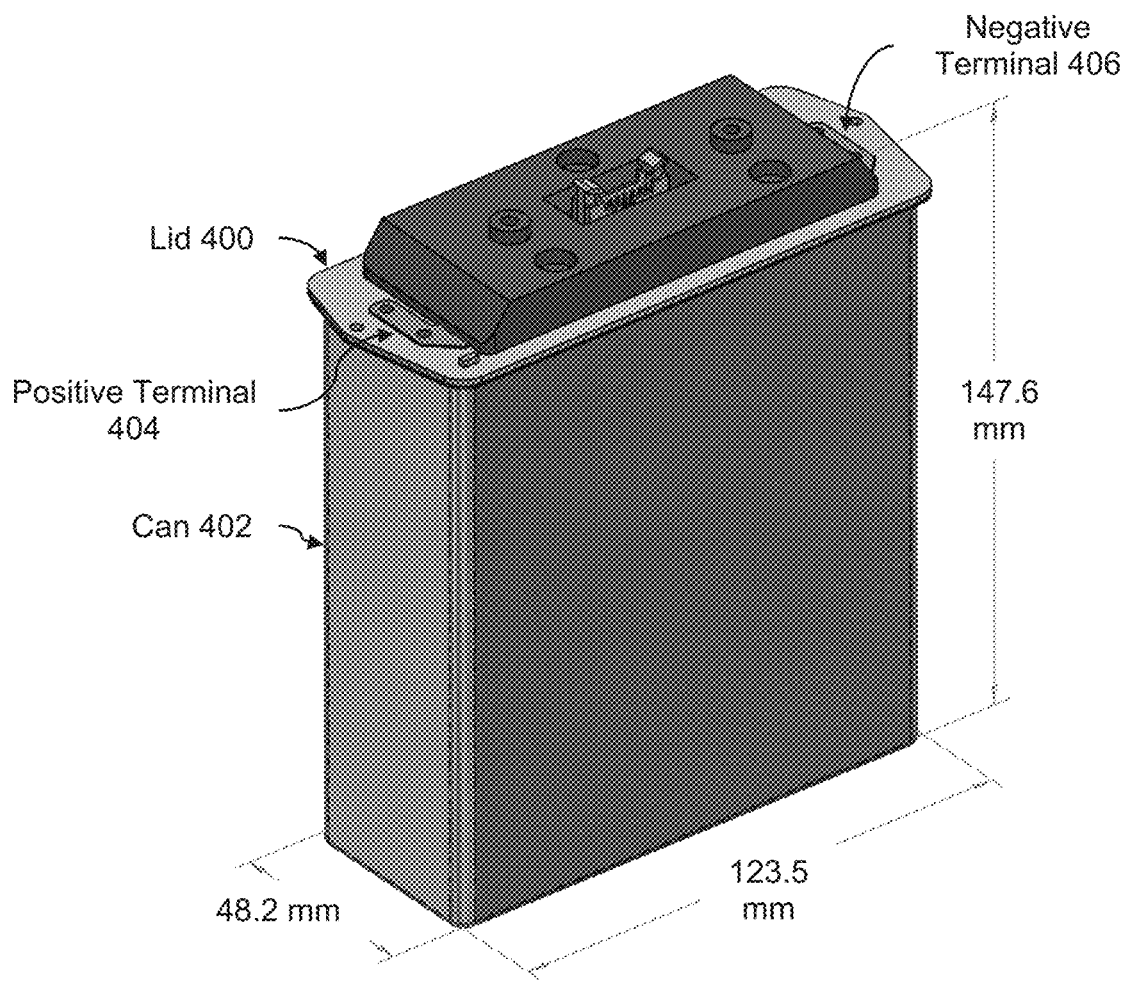
FIG. 4 is a diagram illustrating an embodiment of a can with the lid attached.

FIG. 4 is a diagram illustrating an embodiment of a can with the lid attached. In this example, lid 400 is attached to metal can 402. Tabs (some examples of which are shown in FIG. 3 but which are not shown here) are connected to the underside of lid 400. Inside of the lid, there are electrical connections which permit the electricity coming from the tabs to be conducted to positive terminal 404 and negative terminal 406. This permits the electricity generated by the cells in the can to be accessed externally using a single positive terminal and a single negative terminal.

This figure and the previous figure illustrate another benefit of the battery embodiments described herein. If the contents of a can are free to bounce around (e.g., in an aircraft application), then enough downward force on the tabs may cause the tabs to detach from the bottom of the lid. Since the contents of a compressed can are held in place, tabs in battery embodiments described herein will not pull down and therefore cannot detach from the bottom of the lid which is desirable.

The stacking pattern shown in FIG. 1 is merely one example of how the contents in a metal can may be arranged. The following figures describe some other stacking pattern examples. For clarity, cans and lids are not shown in these figures.

Figure 5:
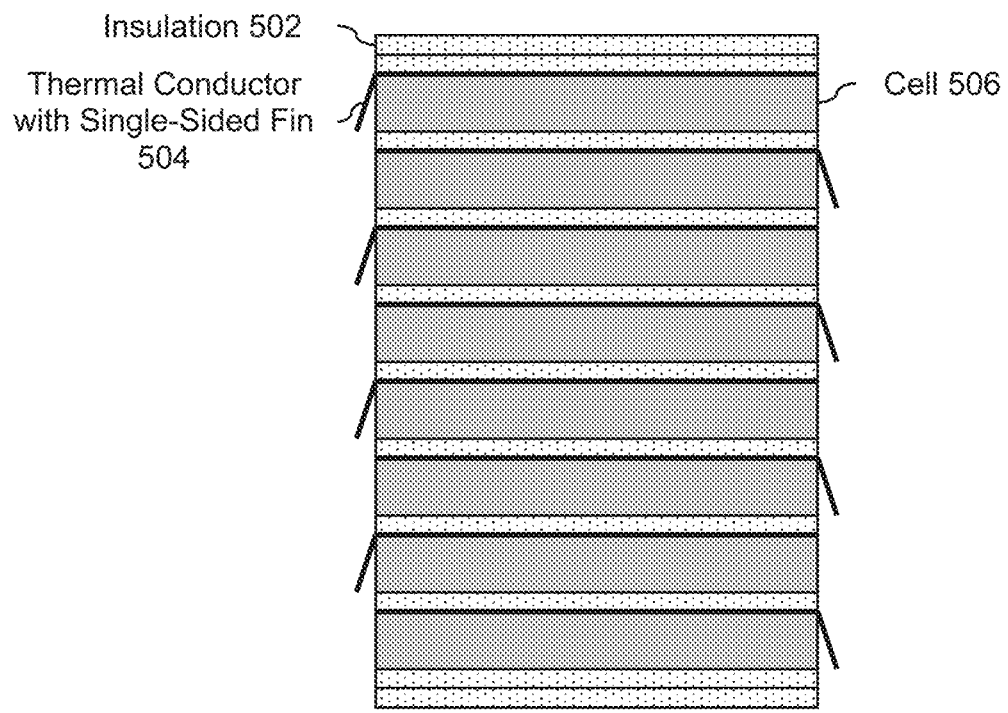
FIG. 5 is a diagram illustrating an embodiment of insulation and battery cells stacked with single-sided fins.

FIG. 5 is a diagram illustrating an embodiment of insulation and battery cells stacked with single-sided fins. From this top view, the exemplary stacking pattern (excluding the two layers of insulation at the top and bottom) is: insulation (502), single-sided fin (504), and cell (506). As described above, a single-sided fin only has one bent portion at one end. In this example, the orientation of the single-sided fins alternates so that one fin will touch one interior side of the can and the next fin will touch the opposite interior side of the can. As such, less heat is transferred between cells (e.g., which further helps prevent catastrophic thermal runaway).

Figure 6:
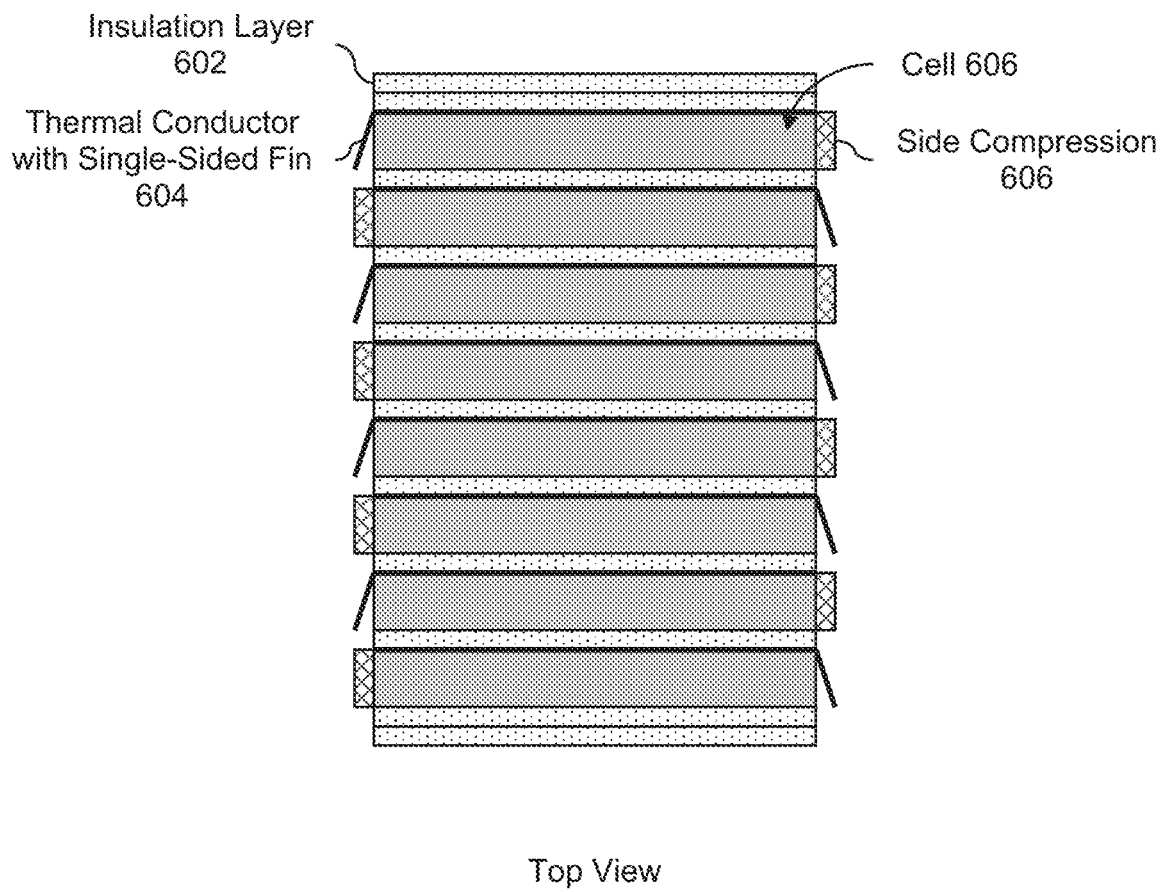
FIG. 6 is a diagram illustrating an embodiment of insulation and battery cells, with side compression on one side, stacked with single-sided fins.

FIG. 6 is a diagram illustrating an embodiment of insulation and battery cells, with side compression on one side, stacked with single-sided fins. From this top view, the exemplary stacking pattern (excluding the two layers of insulation at the top and bottom) is: insulation layer (602), single-sided fin (604), and cell (606). On the side of the cell opposite the bent portion of the fin is side compression (606). In some embodiments, the side compression is made of aerogel and/or is a foam-type material. In this example, the side compression acts to better secure the cell in the compressed can and/or ensure that the cell has some desired amount of pressured applied to it. The side compression further helps to compress the aluminum fins into the inside can wall to provide better thermal contact. In some embodiments, an adhesive is used to stick the side insulation to the cell.

Figure 7:
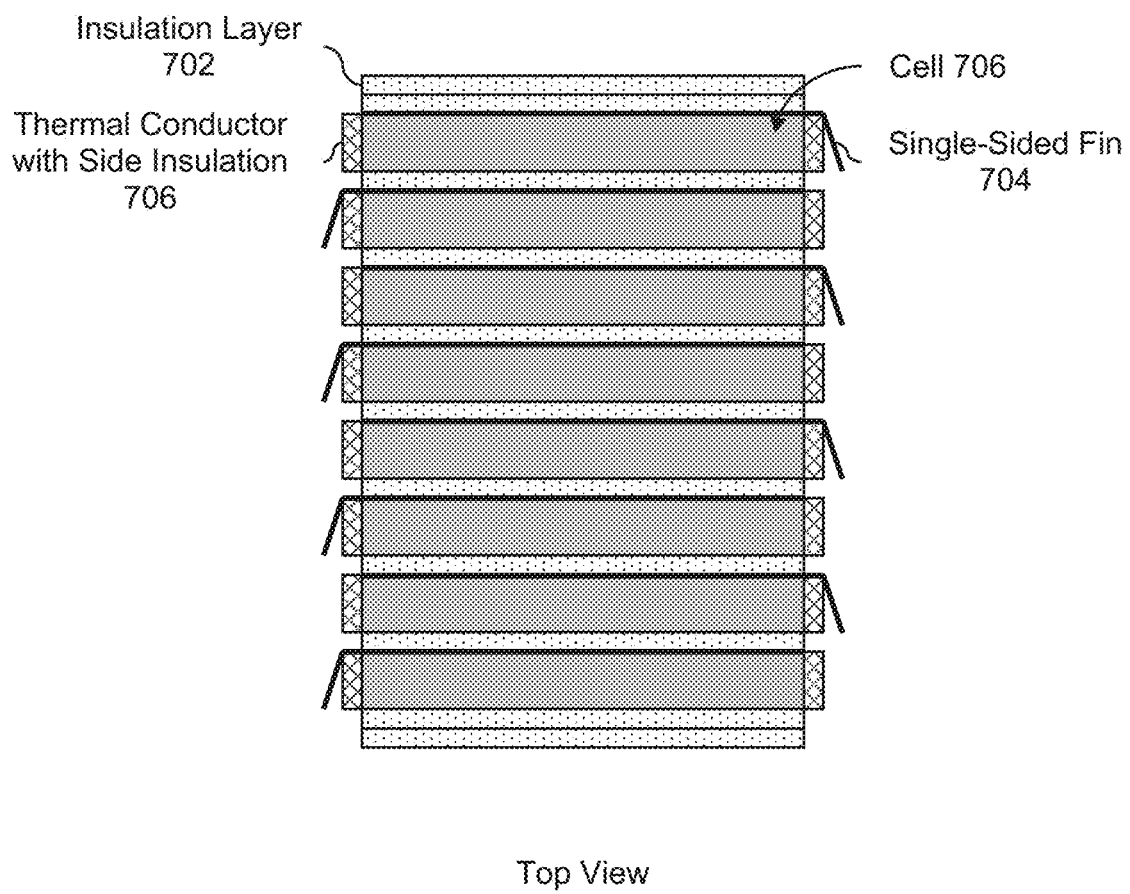
FIG. 7 is a diagram illustrating an embodiment of insulation and battery cells, with side compression on both sides, stacked with single-sided fins.

FIG. 7 is a diagram illustrating an embodiment of insulation and battery cells, with side compression on both sides, stacked with single-sided fins. From this top view, the exemplary stacking pattern (excluding the two layers of insulation at the top and bottom) is: insulation layer (702), single-sided fin (704), and cell (706). In this example, both sides of the cell have side compression (706). On the cell of the cell that has the bent portion of the fin, the side compression is between the cell and the fin.

In some embodiments, a can has one or more vent holes to help dissipate heat. The following figures show some venting examples.

FIG. 8 is a diagram illustrating an embodiment of a can with two vent holes on a side where cans are placed next to each other with terminals of opposite polarity next to each other. For clarity, the lid and some other aspects of the battery are not shown here. Diagram 800 shows a side view of the exemplary can (802). In this example, the can has two holes in the shape of a rounded rectangle near the bottom of the can: vent A (804) and vent B (806). The two vents are at different heights where vent B is located closer to the bottom of the can and vent A is located higher up. The bottom of vent A is higher than the top of vent B, with some margin between the two. Also, vent A is on the negative terminal side of the can and vent B is on the positive terminal side of the can.

Diagram 810 shows a top view of two cans placed next to each other. For example, they may be inserted into cutouts in a frame which holds multiple batteries (see, e.g., FIG. 2). In this example, the orientation of the batteries alternates so that the positive terminal of the left can (812) is next to the negative terminal of the right can (814) and vice versa. With this orientation, the A vent of the can on the left is oriented towards the general vicinity of the B vent of the can on the right. Similarly, the B vent of the can on the left is oriented towards the general vicinity of the A vent of the can on the right. However, since they are at different heights, the vents do not directly face each other (sometimes referred to as overlapping). As a result, any heat or flames emitted from the vent of one can will not have a straight path to a vent of the other can. This is desirable because it prevents (or at least slows or mitigates) thermal runaway and/or one battery from failing when an adjacent battery fails. It is noted that the spacing in diagram 810 is not to scale, and in some real world applications the cans may be only a few inches apart.

This placement of vents may be expressed or defined using axis 808. Axis 808 is a vertical axis which divides the side of the can in half If each vent hole is reflected or otherwise rotated about axis 808, the reflected or rotated vent hole does not overlap with another vent hole on that side. For example, when vent A (804) is reflected or rotated about axis 808, reflected/rotated vent A does not overlap with vent B (806). Similarly, when vent B (806) is rotated or otherwise reflected about axis 808, reflected/rotated vent B does not overlap with vent A (804). If all vent holes are positioned with this property or characteristic in mind, none of the vent holes will be directly face to face or overlap when they are placed next to each other with the orientation shown (e.g., positive terminals next to negative terminals).

Although not shown here, the other sides of the can may also have vent holes which also do not directly face (or otherwise overlap with) other vent holes on an adjacent can. In some cases, all four sides of a can have vent holes.

Naturally, in some other applications the batteries may be oriented with all of the positive terminals next to each other and all negative terminals next to each other. The following figures show some examples of this where the vent holes are placed so that they do not directly face (or otherwise overlap with) one another.

FIG. 9 is a diagram illustrating an embodiment of a can with a single vent hole on a side where cans are placed next to each other with terminals of the same polarity next to each other. In the example shown, diagram 900 shows a first side view of the exemplary can. Vent A (904) is located on this side of the can. Diagram 902 shows the opposite side of the can (e.g., note that the negative terminal is on the left side in diagram 900 but is on the right side in diagram 902). Vent B (906) is located on the side of the can shown in diagram 902 where the bottom of vent A (904) is higher than the top of vent B (906) with some separation between the two.

Diagram 910 shows multiple cans placed next to each other with the positive terminals next to each other and the negative terminals next to each other. As before, even though the A vent from one can is pointing in the general direction of the B vent of another can (and vice versa), because the two types of vents are at different heights, the A and B vents are not facing each other directly. As described above, since there is no direct path from one vent to another, the spread of heat and/or fire from one can to another is prevented or at least slowed down.

Returning to the example of FIG. 8, it is noted that the pattern shown in FIG. 8 will also work for batteries where terminals of the same polarity are placed next to each other. The following figure shows an example of this.

FIG. 10 is a diagram illustrating an embodiment of a can with two vent holes on a side where cans are placed next to each other with terminals of the same polarity next to each other. In the example shown, diagram 1000 shows a side view of a first side of the exemplary can and diagram 1002 shows a side view of the opposite side of the exemplary can. In this example, the same pattern from FIG. 8 is used, but the shape of the vent hole is an oval as opposed to a rounded rectangle. As shown in diagrams 1000 and 1002, both sides shown have a vent A (1004) above and to the left of a vent B (1006). As described above, if vent A were rotated or reflected about axis 1008, it would not overlap with vent B and vice versa.

Diagram 1010 shows multiple cans placed next each other with terminals of the same polarity next to each other. As described above, vent A and vent B face in the general direction of each other, but because they are at different heights there is no direct path between the two, which prevents (or at least slows down) any heat and/or fire transfer from one can to another.

As shown in FIGS. 9 and FIG. 10, a variety of vent hole patterns may be used. In some embodiments (see, e.g., FIG. 9), two different vent hole patterns are used for the two opposite sides where the two vent hole patterns do not overlap. In other embodiments (see, e.g., FIG. 10), the same vent hole pattern is used for the two opposite sides where each vent hole, when rotated or reflected about a vertical axis, does not overlap with another vent hole.

Structurally, it may be desirable to use more smaller vent holes per side as opposed to fewer larger vent holes because it makes it easier for the can to maintain its shape and/or apply the desired amount of pressure for months or even years. The following figures show some examples of this.

FIG. 11 is a diagram illustrating an embodiment of a can with 12 vent holes on a side where cans are placed next to each other with terminals of opposite polarity next to each other. In this example, diagram 1100 shows a side view of the exemplary can where the side is covered from top to bottom with 12 vent holes. The vent holes in this example have a pattern where an A vent (1102) and a B vent (1104) are on the same (left) half as the negative terminal. The A vent and B vent are at different heights where the bottom of the A vent is higher than the top of the B vent with some margin or space between the two. A C vent (1106) and a D vent (1108) are on the same (right) half as the positive terminal. The C vent is at the same height as the A vent, and the D vent is at the same height as the B vent. This pattern repeats so that there are 12 vent holes throughout the side of the can.

Diagram 1110 shows a top view of two cans placed next to each other. In this example, the cans have alternating orientation so that the positive terminal of one is next to the negative terminal of the other. As shown here, the A vents and D vents point in the general direction of each other and the B vents and C vents similarly point the general direction of each other. However, because the A vents and D vents are at different heights, they do not directly face one another. Similarly, the B vents and C vents are at different heights, so they do not directly face one another. This prevents a direct path from the vent of one can to the vent of an adjacent can.

The following figures shows a similar example of 12 vent holes per side where the batteries are oriented with like terminals next to each other.

FIG. 12 is a diagram illustrating an embodiment of a can with 12 vent holes on a side with different patterns where cans are placed next to each other with terminals of the same polarity next to each other. Diagram 1200 shows a first side of the exemplary can. On this side of the can, there are three roles of vent holes where each row has four vent holes at the same height: vent A (1202), vent B (1204), vent C (1206), and vent D (1208). Diagram 1210 shows the opposite side of the exemplary can. On this side, there are also three roles of vent holes where each row has four vent holes at the same height (i.e., vent E (1212), vent F (1214), vent G (1216), and vent H (1218)), but the vent holes are at different heights in diagram 1200 compared to diagram 1210.

Diagram 1220 shows multiple cans lined up with positive terminals next to each other and negative terminals next to each other. As shown here, since the rows of vent holes on the two sides are at different heights, none of the vent holes facing generally toward each other will have a direct path to another vent. That is, vent D and vent E do not directly face each other, vent C and vent F do not directly face each other, vent B and vent G do not directly face each other, and vent A and vent H do not directly face each other.

FIG. 13 is a diagram illustrating a second embodiment of a can with 12 vent holes with the same pattern on each side where cans are placed next to each other with terminals of the same polarity next to each other. In this example, both exemplary sides have the same pattern. As shown in diagram 1300 and diagram 1310, the vent holes have a pattern of vent A (1302), vent B (1304) placed lower than vent A, vent C (1306) at the same height as vent A, and vent D (1308) at the same height as vent B.

Diagram 1320 shows multiple cans lined up with positive terminals next to each other and negative terminals next to each other. Similar to the above examples, vent D does not directly line up with vent A, vent C does not directly line up with vent B, and vice versa.

As shown in this example and previous examples, any number of vent holes per side may be used (e.g., 1, 2, 12, etc.). These examples also show that vent holes may comprise a variety of shapes (e.g., rounded rectangles, rectangles, ovals, etc.) and that vent holes may be placed in any desired location (e.g., all over the side of the can, just towards the bottom, etc.). The examples shown here are merely exemplary and are not intended to be limiting.

In some embodiments, a vent hole is covered with tape (e.g., thermally conductive tape to permit cooling during forward flight in aircraft applications). During normal operation, the tape may prevent debris from entering the battery via a vent hole and/or provide weather sealing. If one or more battery cells fail catastrophically, the failing cell(s) will emit a large amount of heat/fire and/or the pressure will drop which will cause the tape to melt. (The amount of heat released will heat the tape hundreds of ° C. and most commercially available tapes will melt at such temperatures so there is wide variety of tape to choose from.) This, in turn, permits airflow over the exposed contents of the can (i.e., the stacked layers) which helps with heat dissipation when a catastrophic failure occurs.

In some embodiments, intumescent paint (e.g., with fire retardant and/or fire protecting properties) is applied to one or more surfaces or components. Intumescent paint may also provide energy absorption due to phase change. The following figures describe some examples of this. Fire retarding expanding foam may also be used.

Figure 14:
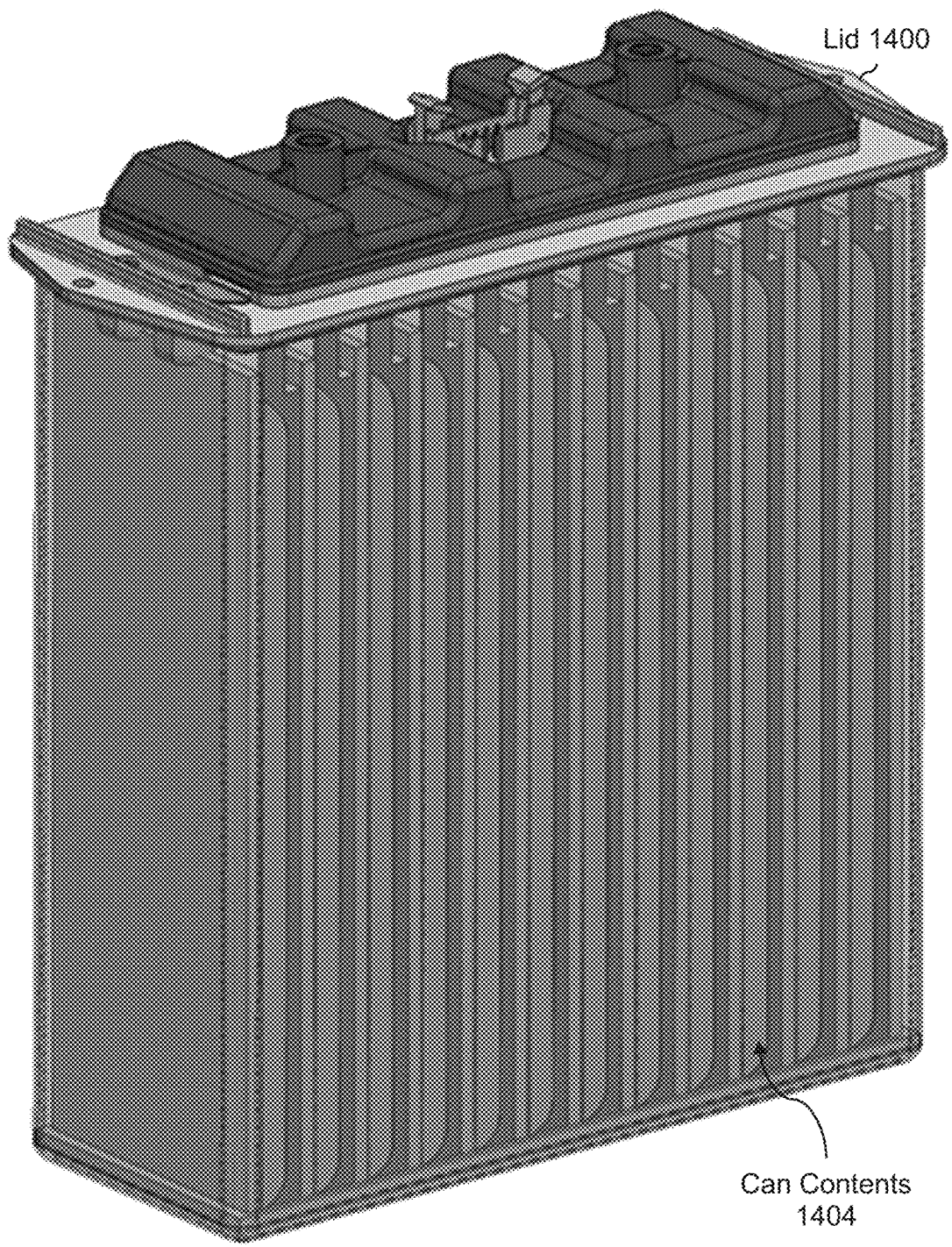
FIG. 14 is a diagram illustrating an embodiment of a lid with the underside painted with intumescent paint.

FIG. 14 is a diagram illustrating an embodiment of a lid with the underside painted with intumescent paint. In this example, a side/cutaway view of the exemplary battery is shown. In this example, lid 1400 is painted with intumescent paint, specifically the underside of the lid. Alternatively the void space between the lid 1400 may be filled with expand fire retardant foam. This part of the lid faces the contents of the can (1404), so that if any of the battery cells in the can fail catastrophically, the lid is protected to some degree. For example, this may protect the electrical connections in the lid (e.g., connecting the tabs to the external terminals) so that the battery is still able to provide at least some power even if one of the battery cells fails catastrophically. The intumescent paint and fire retardant foam also serve to prevent plastic parts from catching fire.

Figure 15:
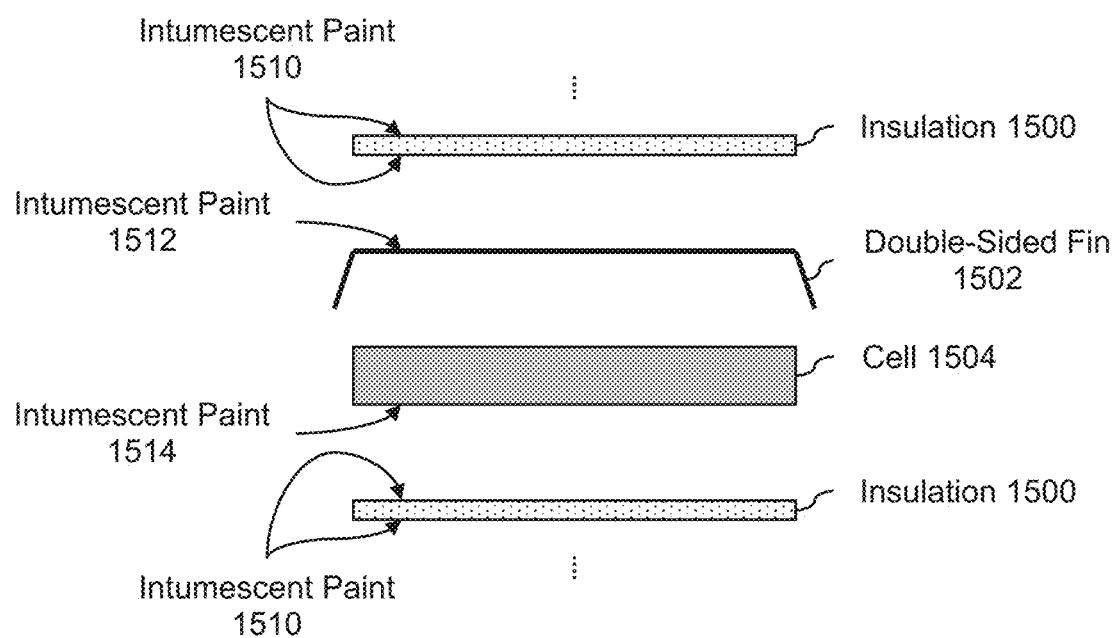
FIG. 15 is a diagram illustrating an embodiment of stacked layers which are painted with intumescent paint.

FIG. 15 is a diagram illustrating an embodiment of stacked layers which are painted with intumescent paint. In the example shown, the pattern of stacked layers is: insulation (1500), double-sided fin (1502), and cell (1504). (i.e., the same pattern from FIG. 1). Intumescent paint (1510) is applied to both sides of insulation 1500, but it does not matter (e.g., for heat dissipation purposes and/or during a catastrophic failure if heat cannot pass through the barrier provided by intumescent paint (1510) because insulation 1500 does that anyway.

Intumescent paint (1512) is also applied to the double-sided fin (1502), specifically on the side that faces the insulation (and not the side that faces or is adjacent to the cell). Applying intumescent paint to only one side of the fin is deliberate choice: on the side facing the insulation, the insulation will block the transfer of heat anyways, so the application of intumescent paint on that side will not change or affect anything. However, if intumescent paint were applied to the side of the fin that faced the cell, the heat from the cell would be prevented from being removed by the fin because of the thermal barrier created by the hypothetical intumescent paint. For this reason, intumescent paint is not applied to the side of the fin facing the cell in this example.

For the same reason, intumescent paint (1514) is only applied to the side of the cell (1504) facing or otherwise adjacent to the insulation (1500). It is not applied to the side of the cell facing the fin because it would create a thermal barrier which would prevent the fin from removing the heat generated by the cell.

For brevity, intumescent paint application examples with the other stacking patterns shown in FIG. 5-FIG. 7 are not described herein. However, intumescent paint may be applied in a manner similar to that shown here to other stacking patterns. In some embodiments, intumescent additives are used in the material (e.g., plastic) for one or more battery components (e.g., a cover, a top, etc.).

The following figures describe a specific battery embodiment in more detail. Naturally, the features shown below for this battery are meant to be illustrative, not limiting.

Figure 16:
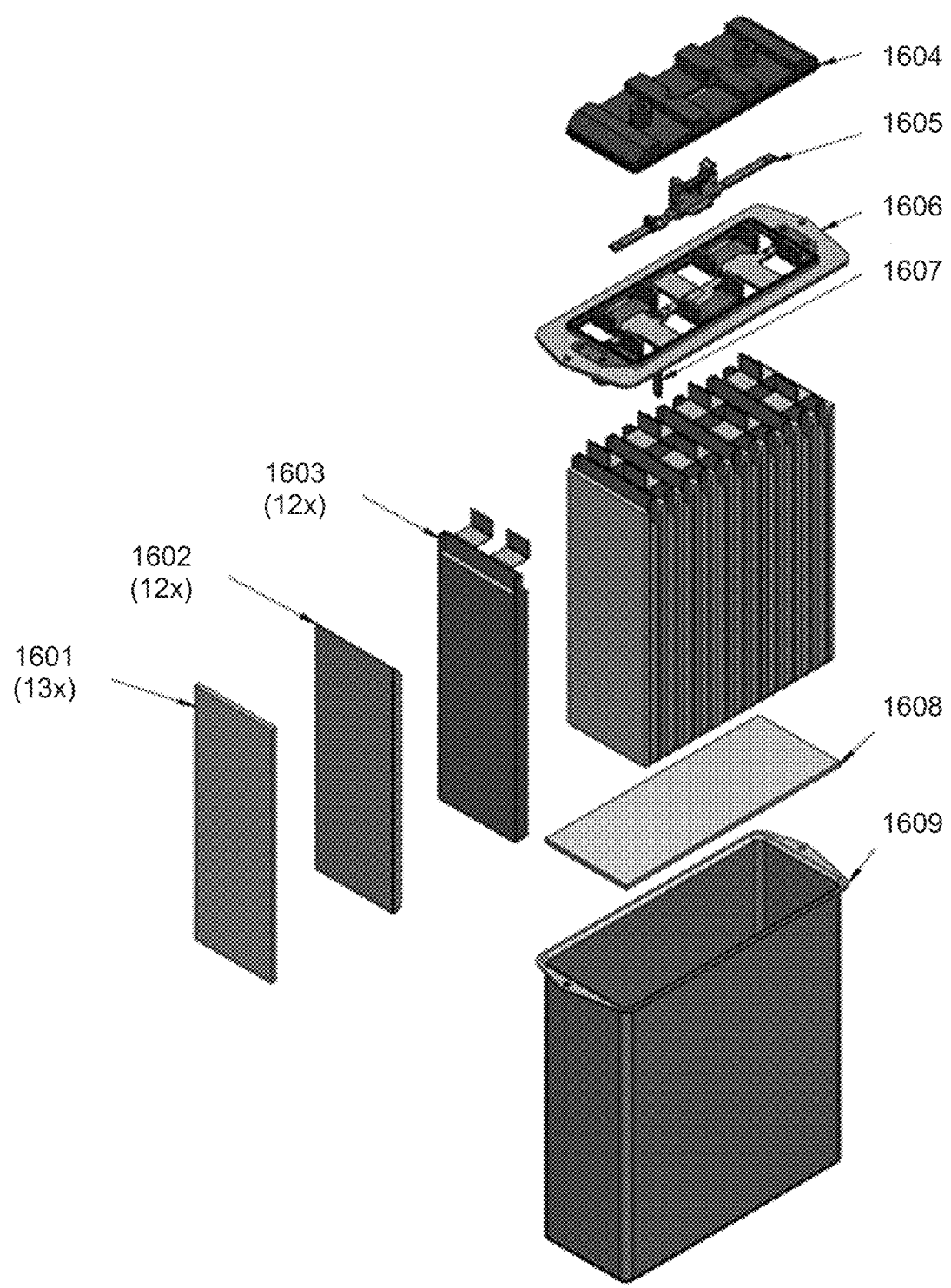
FIG. 16 is a diagram illustrating the assembly and components of an exemplary battery.

FIG. 16 is a diagram illustrating the assembly and components of an exemplary battery. In this example, the battery includes 13 units of insulation (1601), 12 thermal conductors with fins (1602), 12 cells (1603), a tab cover (1604), a printed circuit board (PCB) (1605), a top plate (1606), a thermistor (1607), bottom insulation (1608), and a can (1609).

Figure 17:
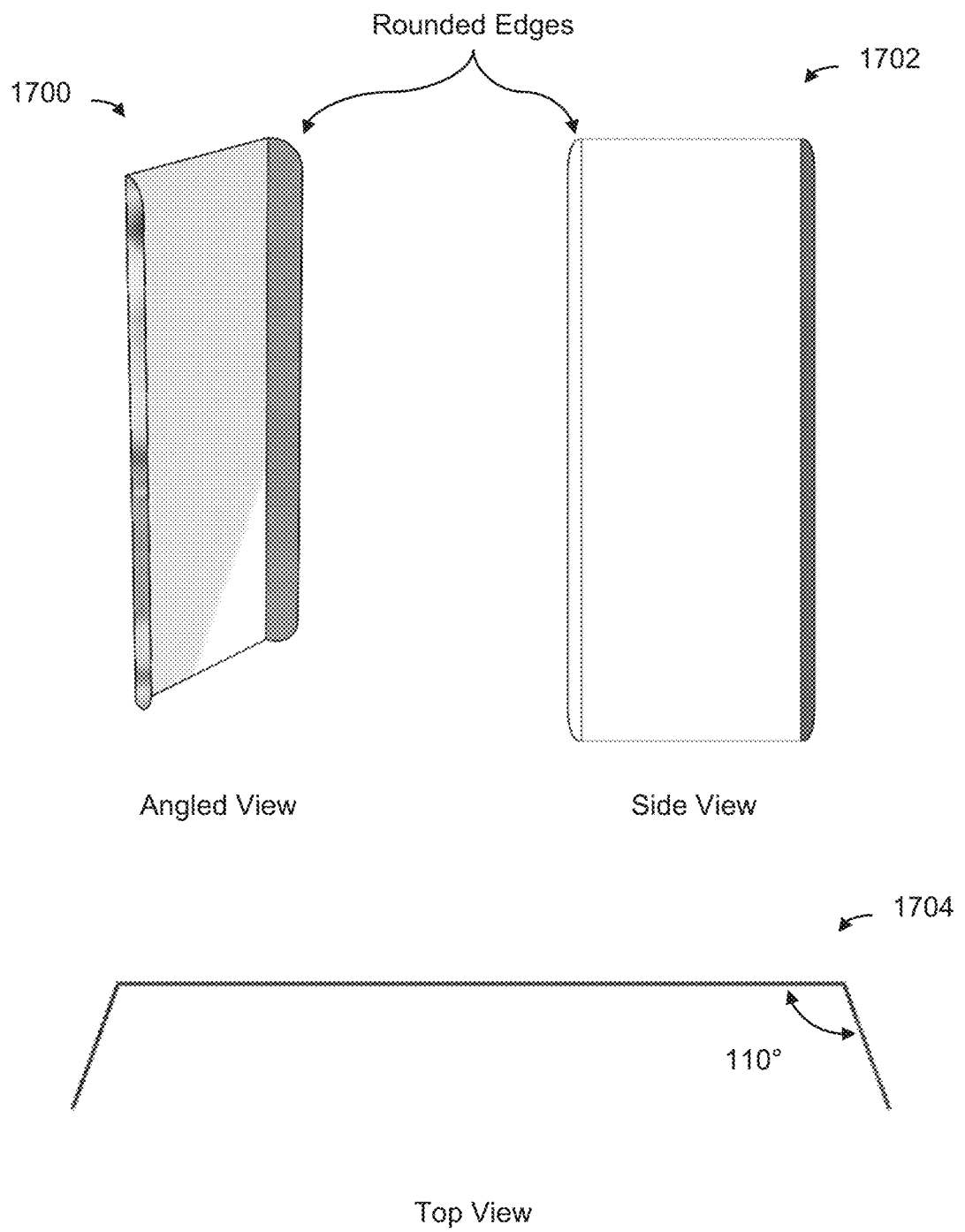
FIG. 17 is a diagram illustrating an embodiment of a thermal conductor with double-sided fins.

FIG. 17 is a diagram illustrating an embodiment of a thermal conductor with double-sided fins. This example continues the previous example and thermal conductor (1602) from FIG. 16 is implemented as shown. In this example, the thermal conductor has a thickness of 0.005" and is made of 1000 series aluminum. As shown in diagrams 1700 and 1702, the fins of the exemplary thermal conductor have rounded corners (edges). In some applications this is desirable because it permits easier insertion into the can and/or is less likely to damage a cell (e.g., because there are no sharp corners). As shown in diagram 1704, the fins of the exemplary thermal conductor have an angle of 110°. In this example, the exemplary thermal conductor shown is not bonded to the cells or insulation.

Figure 18:
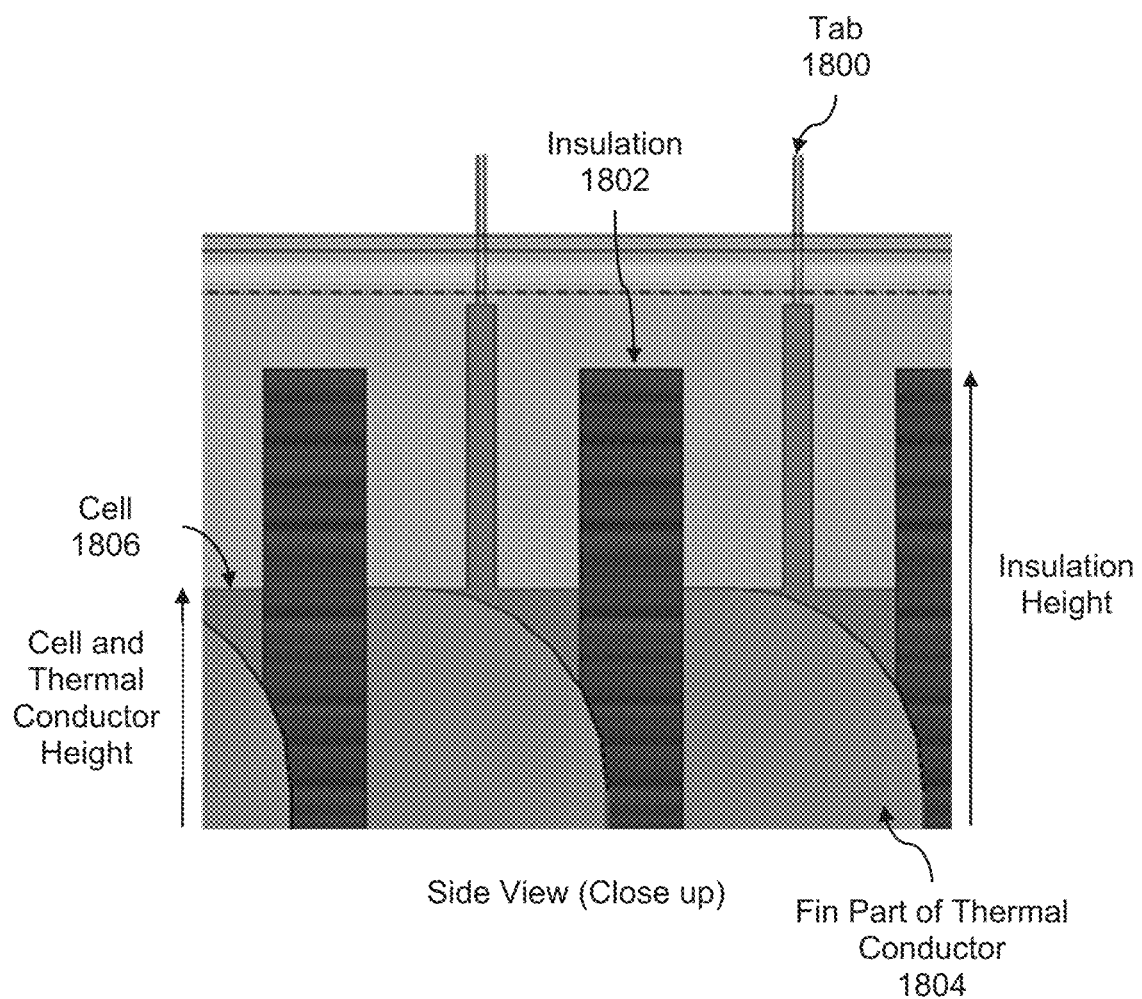
FIG. 18 is a diagram illustrating an embodiment of insulation within stacked layers.

FIG. 18 is a diagram illustrating an embodiment of insulation within stacked layers. A close up, side view of the exemplary stacked layers is shown, including tab 1800, insulation 1802, thermal conductor 1804 (specifically, the fin portion from this view), and cell 1806 (which is partially obscured by the fin from this view). As shown in this diagram, the insulation extends above the height of the cells and thermal conductors (fins). In this example, the insulation is not bonded to the other layers.

Figure 19:
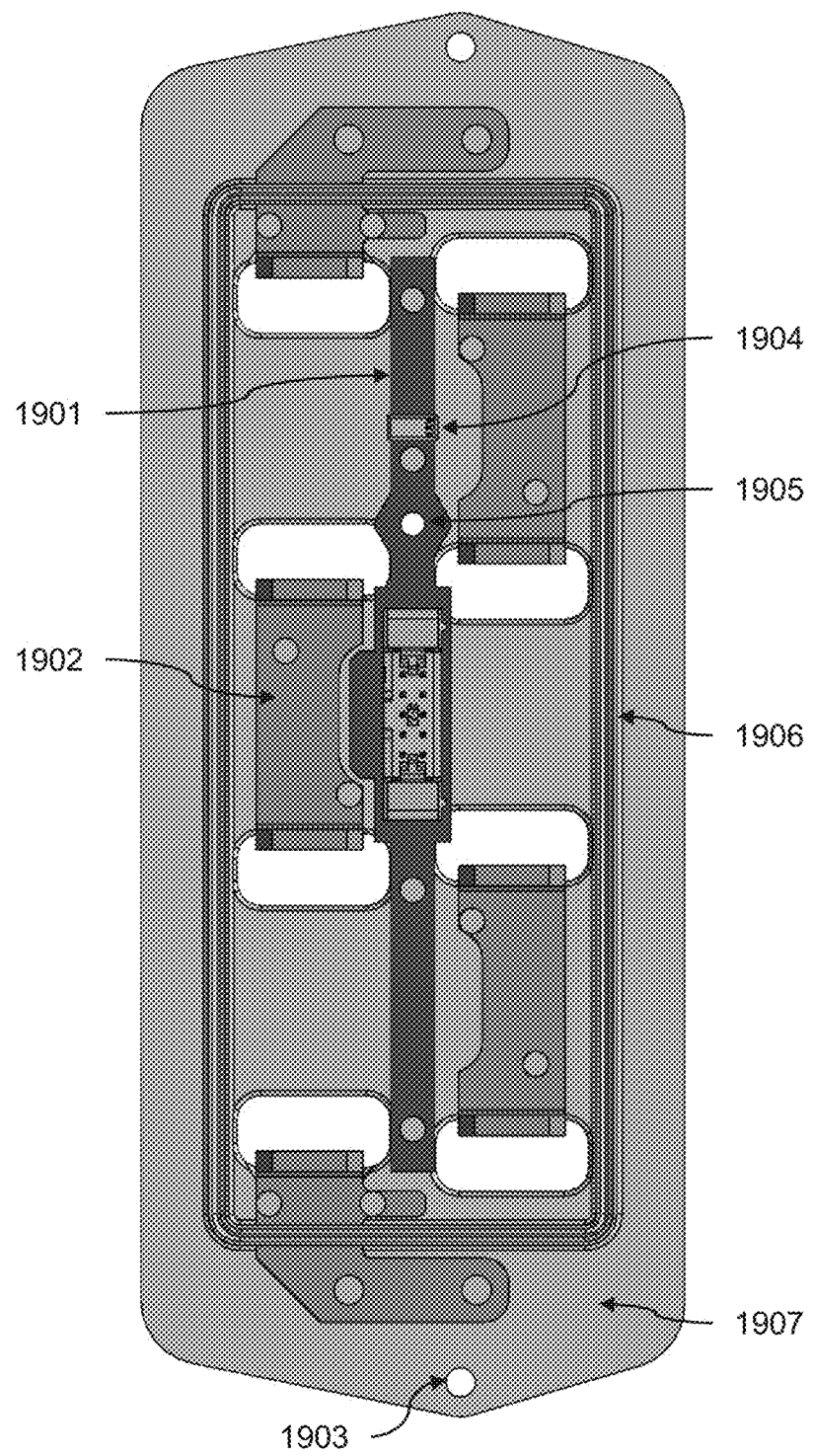
FIG. 19 is a diagram illustrating an embodiment of a PCB and top plate.

FIG. 19 is a diagram illustrating an embodiment of a PCB and top plate. This example continues the previous example and PCB 1605 and top plate 1606 from FIG. 16 are implemented as shown. This example shows a PCB (1901), overmolded interconnects (1902), side panel mounting holes (1903), and IDC connection (1904), a thermistor pass through (1905), tab cover bonds to trough (1906), and a large perimeter to allow for sealing and mounting (1907).

Figure 20:
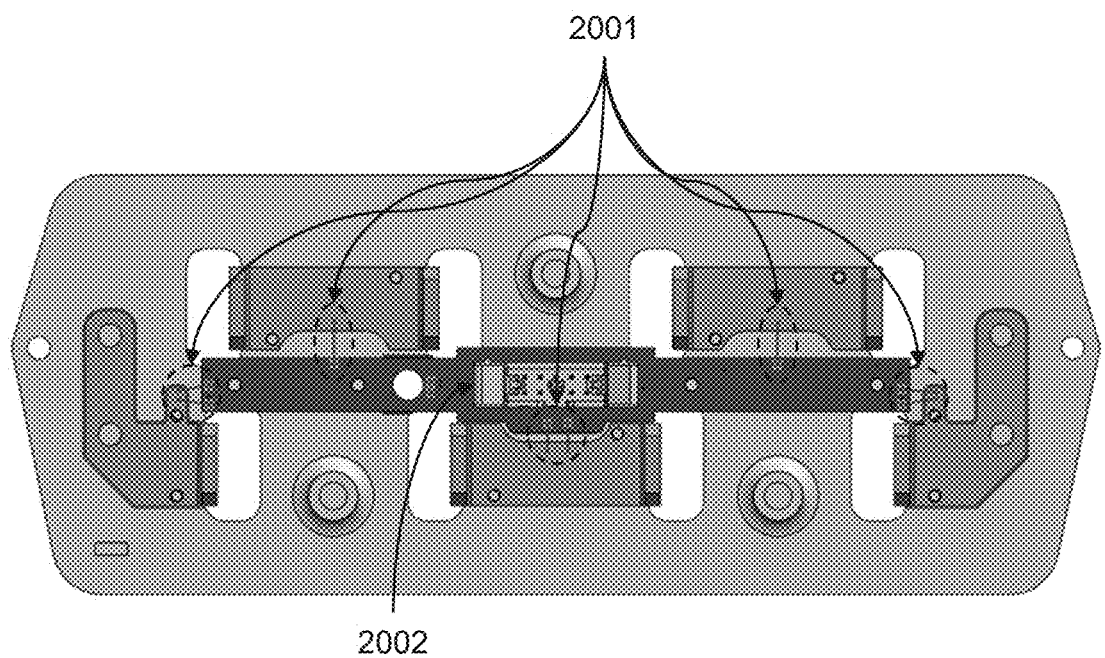
FIG. 20 is a diagram illustrating an embodiment of wire bonding locations.

FIG. 20 is a diagram illustrating an embodiment of wire bonding locations. In the example shown, wire bonds (2001) are shown, along with a connector (2002).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A battery, comprising:
a metal can having a bottom, a top opening, and four sides; and
a plurality of cells stacked inside the metal can, wherein:
at least two opposing sides of the four sides of the metal can are biased inward against the plurality of cells to provide compression,
the plurality of cells are stacked with a plurality of insulation layers and a plurality of thermal conductors having a plurality of single-sided fins according to a stacking pattern of an insulation layer, a thermal conductor and a cell, wherein opposite edges of stacked layers of the plurality of insulation layers, the plurality of thermal conductors and the plurality of cells are aligned;
a thermal conductor having a single-sided fin among the plurality of thermal conductors is located between a cell of the plurality of cells and an insulation layer of the plurality of insulation layers,
wherein an orientation of the plurality of single-sided fins alternates so that one fin touches a first interior side of the metal can and a subsequent fin touches an opposite interior side of the metal can,
wherein the plurality of cells have side compression on at least one side of the cell, wherein the side compression is made of a flexible material that is different than a material of the single-sided fins, and wherein the side compression is provided only on a first side opposite to a second side where a fin is provided.

2. The battery of claim 1, wherein the plurality of cells includes a pouch cell.

3. The battery of claim 1, wherein the metal can is manufactured using one or more of impact extrusion or deep drawing.

4. The battery of claim 1, wherein the metal can includes 1000 series aluminum.

5. The battery of claim 1, wherein the metal can includes a flanged top.

6. The battery of claim 1, wherein:
the plurality of insulation layers includes aerogel; and
the plurality of cells includes a pouch cell.

7. The battery of claim 1 further comprising:
a lid having an underside; and
a plurality of tabs, wherein:
the plurality of cells are electrically connected via the plurality of tabs; and
the plurality of tabs are prevented from pulling down on the underside of the lid by the inward biasing of the metal can.

8. The battery of claim 1, wherein the side compression is provided on a first side opposite to a second side where the fin is provided, and on the second side where the fin is provided.

9. The battery of claim 1, wherein:
the plurality of insulation layers includes aerogel; and
the plurality of cells includes a pouch cell.

10. The battery of claim 1, wherein:
one of the sides of the metal can has a first vent hole and a second vent hole, wherein the first vent hole is on a first side of a vertical axis which runs through said side of the metal can and the second vent hole is on a second side of the vertical axis; and
if the first vent hole were rotated about the vertical axis to produce a rotated first vent hole, the rotated first vent hole would not overlap with the second vent hole.

11. The battery of claim 1, wherein:
one of the sides of the metal can has a first vent hole and a second vent hole, wherein the first vent hole is on a first side of a vertical axis which runs through said side of the metal can and the second vent hole is on a second side of the vertical axis;
if the first vent hole were rotated about the vertical axis to produce a rotated first vent hole, the rotated first vent hole would not overlap with the second vent hole; and
the first vent hole and the second vent hole are covered by tape.

12. The battery of claim 1, wherein:
a first side of a first metal can has a first vent hole;
a second side of a second metal can has a second vent hole, wherein the bottom of the first vent hole is higher than the top of the second vent hole; and
if the first metal can and the second metal can were placed next to each other with the first side facing the second side, the first vent hole and the second vent hole would not overlap.

13. The battery of claim 1, wherein:
a first side of a first metal can has a first vent hole;
a second side of a second metal can has a second vent hole, wherein the bottom of the first vent hole is higher than the top of the second vent hole;
if the first metal can and the second metal can were placed next to each other with the first side facing the second side, the first vent hole and the second vent hole would not overlap; and the first vent hole and the second vent hole are covered by tape.

14. The battery of claim 1, wherein a fire retardant substance is applied to one or more of the following: an underside of a lid, insulation, a side of a fin not adjacent to one of the plurality of cells, or a side of one of the plurality of cells adjacent to insulation.

15. The battery of claim 1, wherein a fire retardant substance is applied to one side of the fin facing an insulation layer; and the fire retardant substance is not applied to another side of the fin facing the cell.

16. The battery of claim 1, further comprising:
a lid having an underside facing the plurality of cells, wherein a void space between the underside of the lid and the plurality of cells is filled with expanding fire retardant foam.

17. The battery of claim 1, wherein the fin of the thermal conductor is sandwiched between an interior of the metal can and the cell adjacent to the thermal conductor with the fin.

18. A battery, comprising:
a metal can;
a plurality of cells stacked inside the metal can;
a plurality of insulation layers; and
a plurality of thermal conductors having a plurality of single-sided fins,
wherein the plurality of cells are stacked with the plurality of insulation layers and the plurality of thermal conductors according to a stacking pattern of an insulation layer, a thermal conductor and a cell,
wherein an orientation of the plurality of single-sided fins alternates so that one fin touches a first interior side of the metal can and a subsequent fin touches an opposite interior side of the metal can,
wherein the plurality of cells has side compression on at least one side of the cell, wherein the side compression is made of a flexible material that is different than a material of the single-sided fins,
wherein the side compression is provided only on a first side opposite to a second side where a fin is provided.

* * * * *